United States Patent
Eum et al.

(10) Patent No.: US 7,146,625 B2
(45) Date of Patent: Dec. 5, 2006

(54) DISC CARTRIDGE AND DISC DRIVE USING THE SAME

(75) Inventors: Jae-yong Eum, Gyeonggi-do (KR);
Yong-hoon Lee, Gyeonggi-do (KR);
Hong-kyun Yim, Gyeonggi-do (KR);
Chong-sam Chung, Gyeonggi-do (KR);
Han-kook Choi, Gyeonggi-do (KR);
Takizawa Teruyuki, Neyagawa (JP);
Saji Yoshito, Nishinomiya (JP);
Okazawa Hironori, Katano (JP)

(73) Assignees: Samsung Electronics Co., Ltd., Suwon-si (KR); Matsushita Electric Industrial Co., Ltd., Osaka (JP)

( * ) Notice: Subject to any disclaimer, the term of this patent is extended or adjusted under 35 U.S.C. 154(b) by 365 days.

(21) Appl. No.: 10/392,398

(22) Filed: Mar. 20, 2003

(65) Prior Publication Data

US 2003/0235144 A1    Dec. 25, 2003

(30) Foreign Application Priority Data

Mar. 20, 2002  (KR) ................................ 2002-15162
Jul. 27, 2002  (KR) ..................... 10-2002-0044499

(51) Int. Cl.
*G11B 3/70*  (2006.01)
*G11B 5/84*  (2006.01)

(52) U.S. Cl. .................... 720/742; 369/291.1; 360/133
(58) Field of Classification Search ................ 360/133; 369/291.1; 720/742
See application file for complete search history.

(56) References Cited

U.S. PATENT DOCUMENTS 5,278,717 A    1/1994  Sasaki et al.
6,157,605 A  * 12/2000 Mori ........................... 720/648
6,583,956 B1 *  6/2003 Kikuchi et al. ............. 360/133
6,590,858 B1 *  7/2003 Inoue .......................... 720/742
6,900,965 B1 *  5/2005 Inoue et al. ................. 360/133
6,901,602 B1 *  5/2005 Inoue .......................... 720/742
6,909,580 B1 *  6/2005 Kurosawa ................... 360/133
6,922,312 B1 *  7/2005 Oishi .......................... 360/133
6,983,477 B1 *  1/2006 Takizawa et al. ........... 720/738
7,003,788 B1 *  2/2006 Shiomi et al. .............. 720/738
7,017,170 B1 *  3/2006 Iwaki et al. ................ 720/741

FOREIGN PATENT DOCUMENTS

JP    11345475      12/1999
JP    2001-283556   10/2001

* cited by examiner

*Primary Examiner*—Allen Cao
(74) *Attorney, Agent, or Firm*—Stein, McEwen & Bui, LLP

(57) ABSTRACT

A disc cartridge includes a case accommodating a disc and having an aperture hole formed on a first surface of the case so that a recording/reproducing apparatus access a recording surface of the disc, and an open hole formed on a second surface to be open to an outside of the case, a shutter opening/shutting the aperture hole and installed in the case, a disc holder installed at a side defining the open hole to move up and down and covering a gap between an outer circumference of the disc and an inner surface of the side defining the open hole when the disc holder descends, and a shutter driving mechanism moving the shutter so that the aperture hole is open/shut. Thus, a passage through which dust is introduced toward an information area of the disc, and a gap formed at an outer circumference are blocked by the disc holder so that a possibility of contamination by dust can be reduced.

12 Claims, 31 Drawing Sheets

DISC CARTRIDGE AND DISC DRIVE USING THE SAME

CROSS-REFERENCE TO RELATED APPLICATIONS

This application claims the benefit of Korean Application Nos. 2002-15162 and 2002-44499, filed Mar. 20, 2002 and Jul. 27, 2002, in the Korean Intellectual Property Office, the disclosure of which is incorporated herein by reference.

BACKGROUND OF THE INVENTION

1. Field of the Invention

The present invention relates to a disc cartridge accommodating a disc that is an information recording/reproducing medium, and protecting a recording surface thereof from contaminants, such as dust or a fingerprint.

2. Description of the Related Art

In general, disc cartridges accommodate discs that are information recording/reproducing media and are loaded in disc drives. As shown in FIG. 1, a conventional disc cartridge 100 includes upper and lower cases 103 and 101 accommodating a disc D therebetween, and a shutter 110 rotatably installed on the lower case 101 to selectively open and shut an aperture hole 102 formed on the lower case 101 so that a pickup (not shown) of a disc drive can access the disc D. An open hole 103b is formed on the upper case 103 to exchange and clamp the disc D. An escape prevention lever 103a is slidably installed at the upper case 103 to prevent the disc D from escaping through the open hole 103b. Thus, when the disc D is installed in the disc cartridge 100, the escape prevention lever 103a is pushed back so as not to interfere with the disc D. When the installation of the disc D is completed, the escape prevention lever 103a is pushed forward as shown in FIG. 1, so that a tip end portion of the escape prevention lever 103a prevents the disc D from escaping through the open hole 103b.

When the disc cartridge 100 having the disc D is inserted into the disc drive (not shown) as shown in FIG. 2A, an opening lever 120 installed at the disc drive first pushes a locking piece 111a so that a protrusion 111c of the shutter 110 and a groove 101a of the lower case 101 are unlocked. Next, as shown in FIG. 2B, the opening lever 120 pushes an interference piece 111b so that the shutter 110 pivots around left and right rotation shafts 110a. The shutter 110 is installed to rotate around the left and right rotation shafts 110a and includes first and second shutter portions 111 and 112 that are engaged with each other through an engagement gear portion 113. When the first shutter portion 111 integrally formed with the interference piece 111b rotates clockwise, the second shutter portion 112 rotates counterclockwise so that the first and second shutter portions 111 and 112 are separated from each other, and the aperture hole 102 is open.

Then, a turntable (not shown) and a damper (not shown) of the disc drive enter the aperture hole 102 and the open hole 103b, respectively, to clamp the disc D. Next, the pickup accesses a recording surface of the disc D to record and/or reproduce information on/from the recording surface of the disc D. Although not shown in the drawings, a torsion spring elastically biasing the first shutter portion 111 counterclockwise, that is, in a direction in which the aperture hole 102 is shut, is installed at the rotation shaft 110a between the first shutter portion 111 and a bottom surface of the lower case 101. Accordingly, when a force applied by the opening lever 120 is removed, the shutter 110 is returned to an original shut state.

However, in the above-described structure, a possibility that the recording surface is contaminated by dust coming through the open hole 103b of the upper case 103 is high. Of course, since an upper surface of the disc D facing the open hole 103b is not a recording surface, the contamination by dust does not directly affect the recording surface of the disc D. However, when the dust comes in the disc cartridge 100 and accumulates on the shutter 110, the dust on the shutter 110 adheres to the recording surface of the disc D during an opening/shutting operation of the shutter 110.

Also, the shutter 110 is installed between the upper and lower cases 103 and 101, the disc D is placed on the shutter 110, and the recording surface of the disc D (a lower surface of the disc in the drawing) and the shutter 110 make a surface contact during the opening/shutting operation of the shutter 110, thereby causing a damage, such as a scratch, on the recording surface of the disc D. Therefore, a structure which can prevent introduction of the dust and protect the recording surface of the disc D from the dust is needed.

SUMMARY OF THE INVENTION

To solve the above and/or other problems, it is an aspect of the present invention to provide a disc cartridge having an improved structure by which dust is prevented from coming into a case and a recording surface of the disc can be protected during an opening/shutting operation of a shutter.

Additional objects and advantages of the invention will be set forth in part in the description which follows and, in part, will be obvious from the description, or may be learned by practice of the invention.

To achieve the above and/or other aspects, a disc cartridge includes a case accommodating a disc, an aperture hole formed on a first surface of the case so that a recording/reproducing apparatus accesses a recording surface of the disc, an open hole formed on a second surface to be open to an outside of the case, a shutter opening/shutting the aperture hole and installed in the case, a disc holder installed at a side of the second surface defining the open hole to move up and down, and covering a gap between an outer circumference of the disc and an inner surface of the second surface when the disc holder descends, and a shutter driving mechanism moving the shutter so that the aperture hole is shut when the disc holder descends.

To achieve the above and/or other aspects, a disc cartridge includes a case accommodating a disc, an aperture hole formed on a first surface of the case so that a recording/reproducing apparatus accesses a recording surface of the disc, an open hole formed on a second surface to be open to an outside of the case, a ring rotator rotatably installed at the case and receiving an outer circumference of the disc, a shutter opening/shutting the aperture hole and installed in the case, a disc holder installed at a side of the second surface defining the open hole of the case to move up and down to cover a gap between the outer circumference of the disc and an inner surface of the second surface when the disc holder descends, and a rotation driving mechanism rotating the ring rotator.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
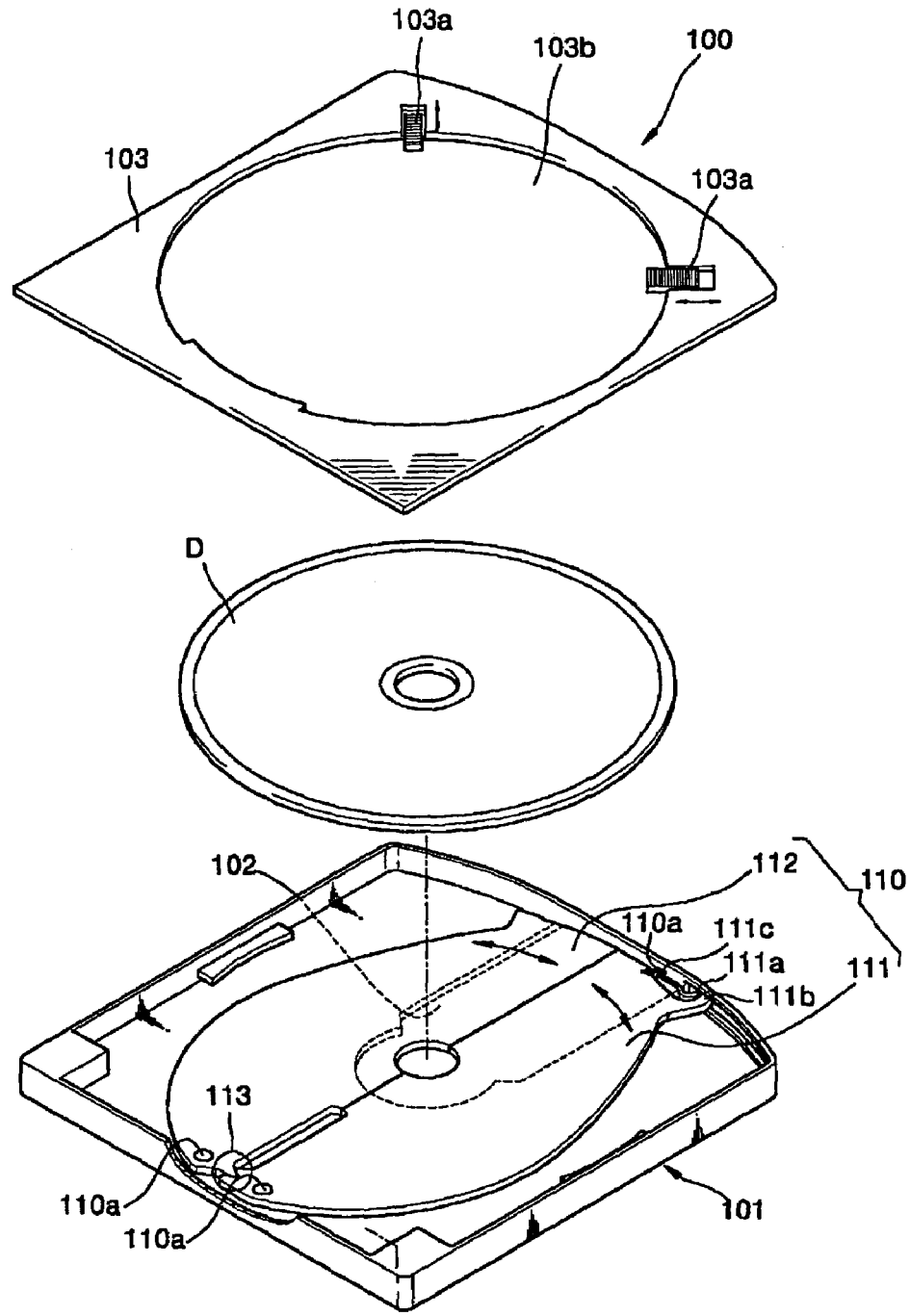
FIG. 1 is a perspective view showing a conventional disc cartridge.
Figure 2A:
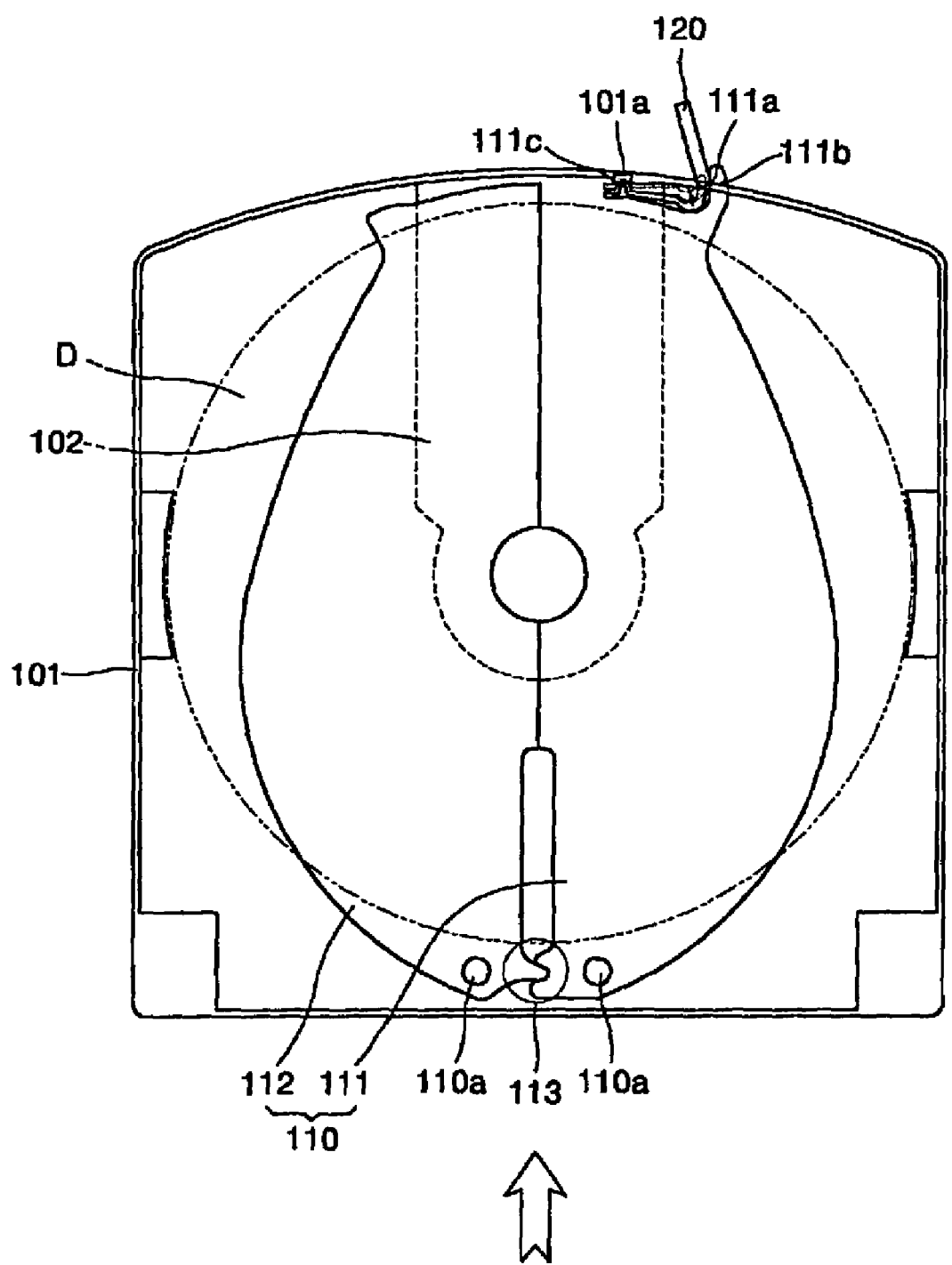
FIGS. 2A and 2B are plan views showing a shutter opening/shutting state of the disc cartridge shown in FIG. 1.
Figure 2B:
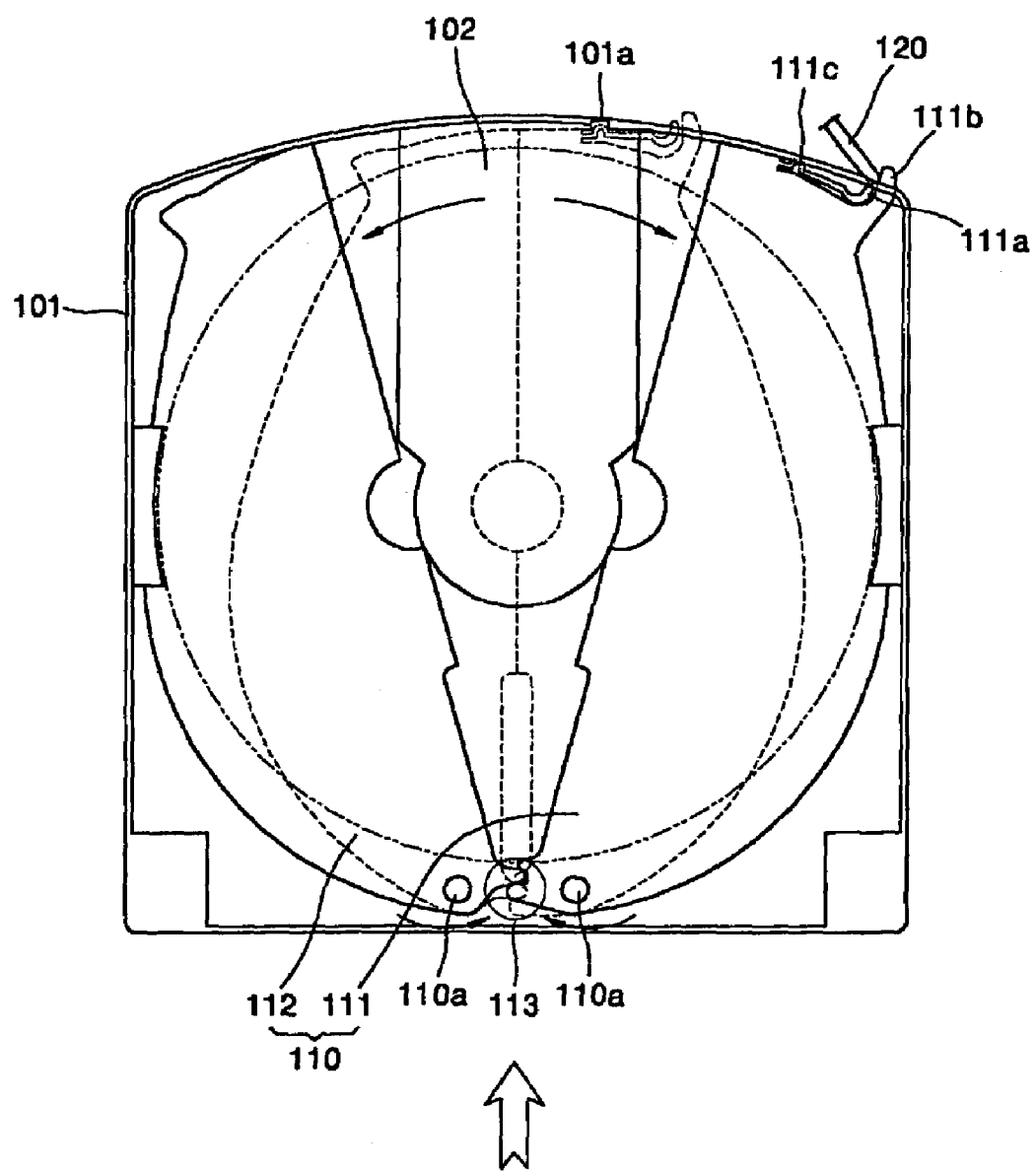

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
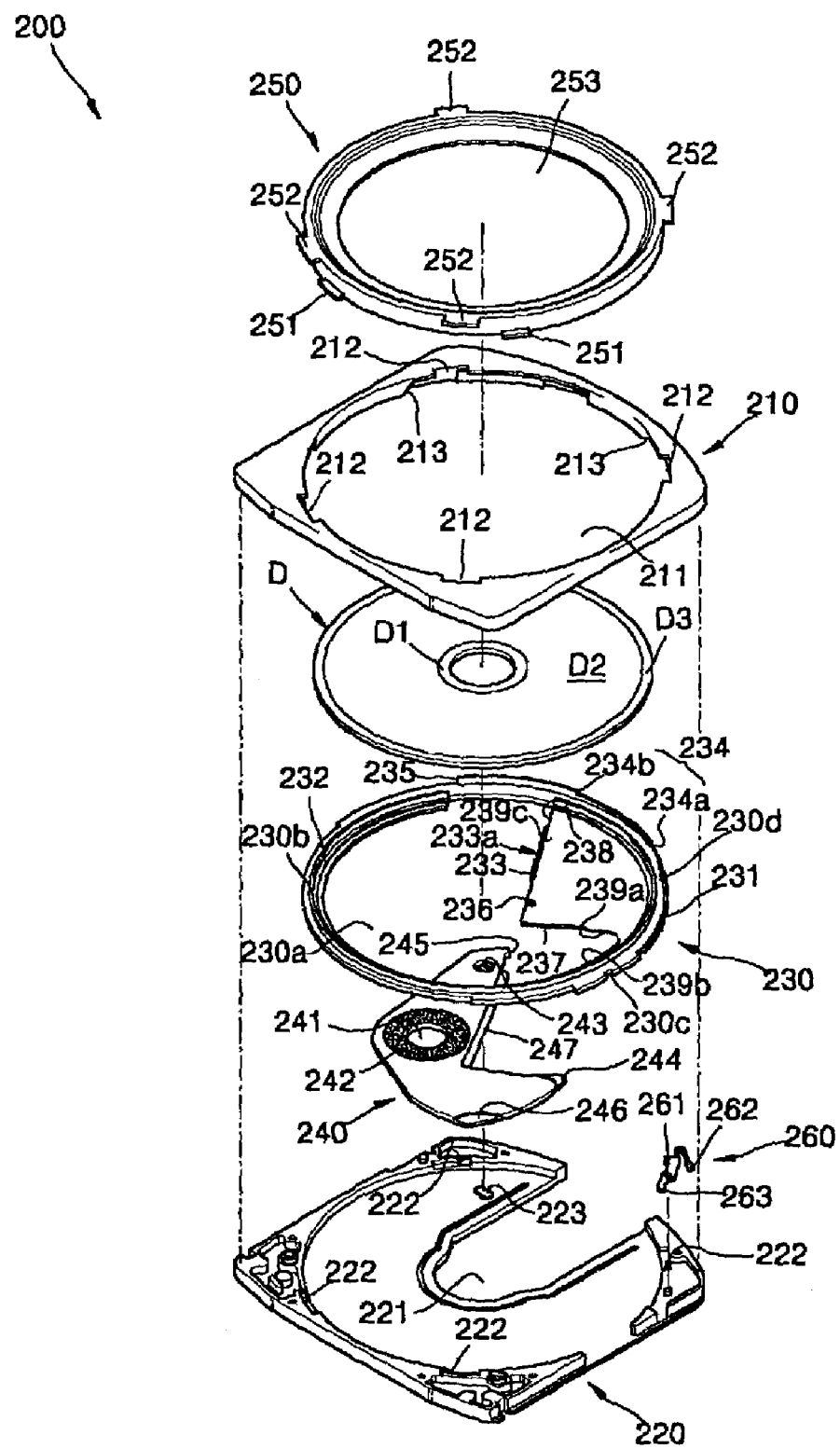
FIG. 3 is an exploded perspective view of a disc cartridge according to an embodiment of the present invention.
Figure 4:
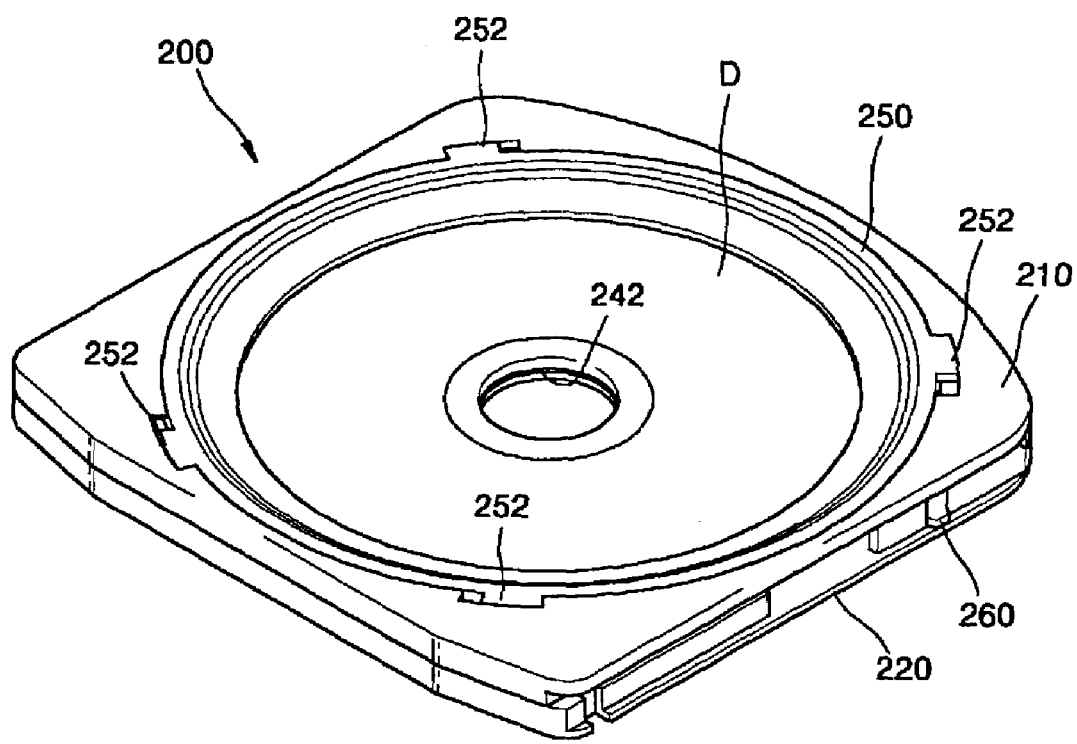
FIG. 4 is a perspective view showing an assembled state of the disc cartridge shown in FIG. 3.

FIGS. 3 and 4 show a disassembled state and an assembled state of a disc cartridge 200, respectively, according to an embodiment of the present invention. Referring to FIGS. 3 and 4, the disc cartridge 200 includes a case formed of upper and lower cases 210 and 220 accommodating a disc D therebetween, a shutter opening and shutting an aperture hole 221 formed in the lower case 220 under the disc D, and a disc holder 250 installed between the upper and lower cases 210 and 220 to ascend and descend. The upper case 210 is coupled to an upper surface of the lower case 220, and an open hole 211 open to an outside of the case is formed on the upper case 210.

The shutter includes a circular shutter member 230 rotatably installed at the lower case 220 and having an accommodation surface 232 on which an outer circumference D3 of the disc D is disposed, and a pivot shutter member 240 installed to pivot within a cut portion 230a of the circular shutter member 230. A coupling hole 243 is formed on the pivot shutter member 240 to be coupled to a pivot shaft 223 provided at the lower case 220. The aperture hole 221 is opened or shut through the cut portion 230a according to a movement of the circular shutter member 230 and the pivot shutter member 240. A detailed opening/shutting operation thereof will be described later.

Figure 5A:
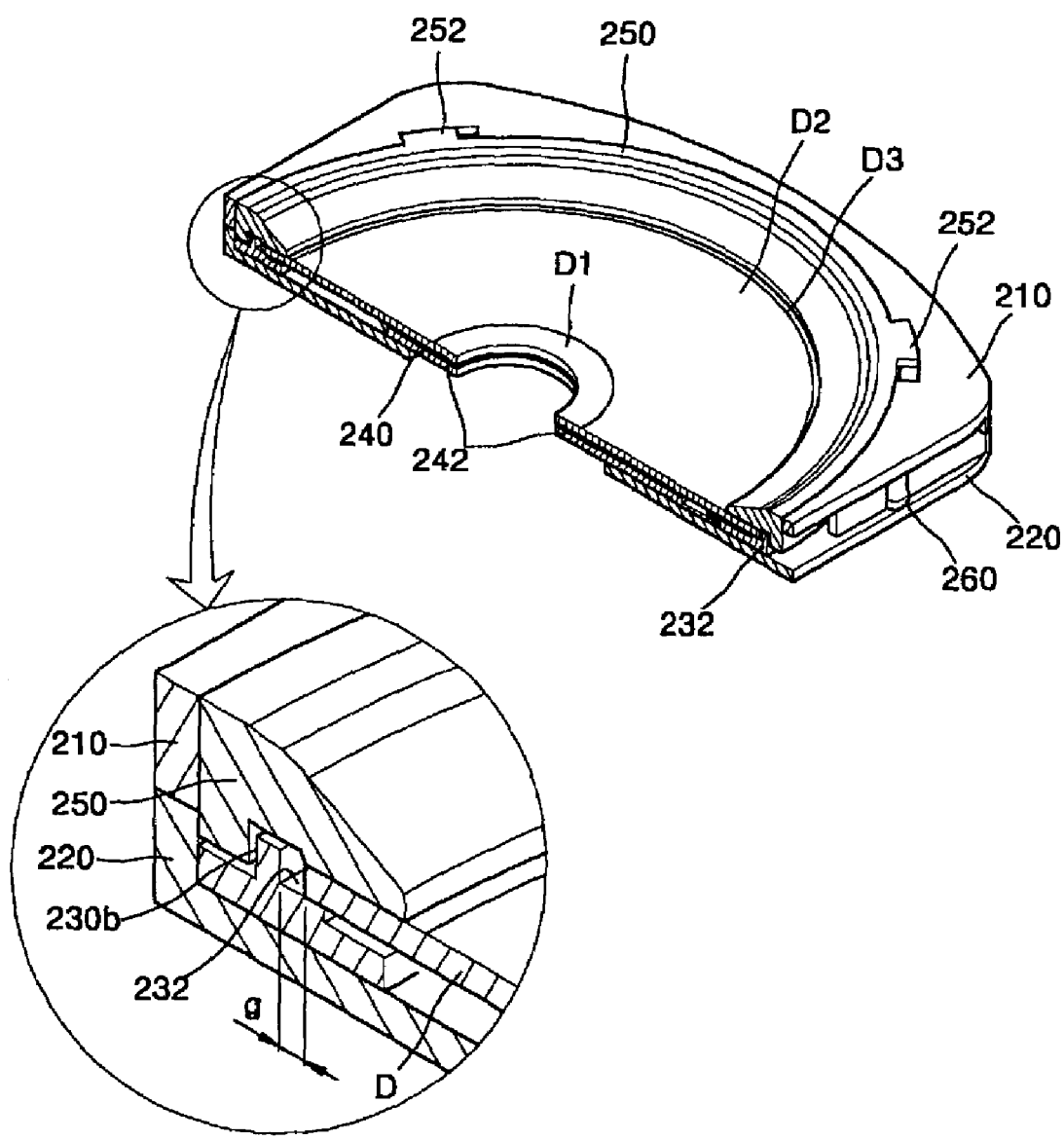
FIGS. 5A and 5B are views showing descending and ascending states of a disc holder in the disc cartridge shown in FIG. 3.

The disc holder 250 ascends in a state in which the disc cartridge 200 is inserted into a disc drive (not shown) and descends when the disc cartridge 200 is ejected to an outside of the disc drive. When the disc holder 250 descends, the disc holder 250 closely contacts the outer circumference D3 of the disc D and an outer circumference 230b of the circular shutter member 230 as shown in FIG. 5A. This operation performs a sort of a cover function so that a recording surface D2 of the disc D is prevented from being contaminated by the dust coming through the open hole 211 and accumulating in a gap g between the outer circumference 230b of the circular shutter member 230 and the outer circumference D3 of the disc D. In other words, an interval between the outer circumference D3 of the disc D and an inner surface of the upper case 210 defining the open hole 211 is covered to prevent dust from being introduced therein. Also, as the disc holder 250 descends, since the disc holder 250 presses the disc D toward the accommodation surface 232 of the circular shutter member 230, the disc D is firmly held and is not moved. The disc holder 250 has a ring shape in which a through hole 253 having a diameter greater than that of a non information area D1 at an inner circumference side of the disc D and less than that of an outermost circumference of the disc D is formed at the center thereof. Thus, when the disc holder 250 closely contacts a circumference of an upper surface of the disc D, the upper surface of the disc D disposed at an inner side of the disc holder 250 defining the through hole 253 is exposed through the open hole 211.

An elevation mechanism ascending and descending the disc holder 250, and a shutter driving mechanism moving the circular shutter member 230 and the pivot shutter member 240 to open and shut the aperture hole 221, are described below.

First, the shutter driving mechanism includes a gear portion 231 provided at the circular shutter member 230, an engagement unit making the pivot shutter member 240 to pivot by being engaged with a rotation of the circular shutter member 230, and a locking unit selectively locking the circular shutter member 230 on the lower case 220.

Figure 6A:
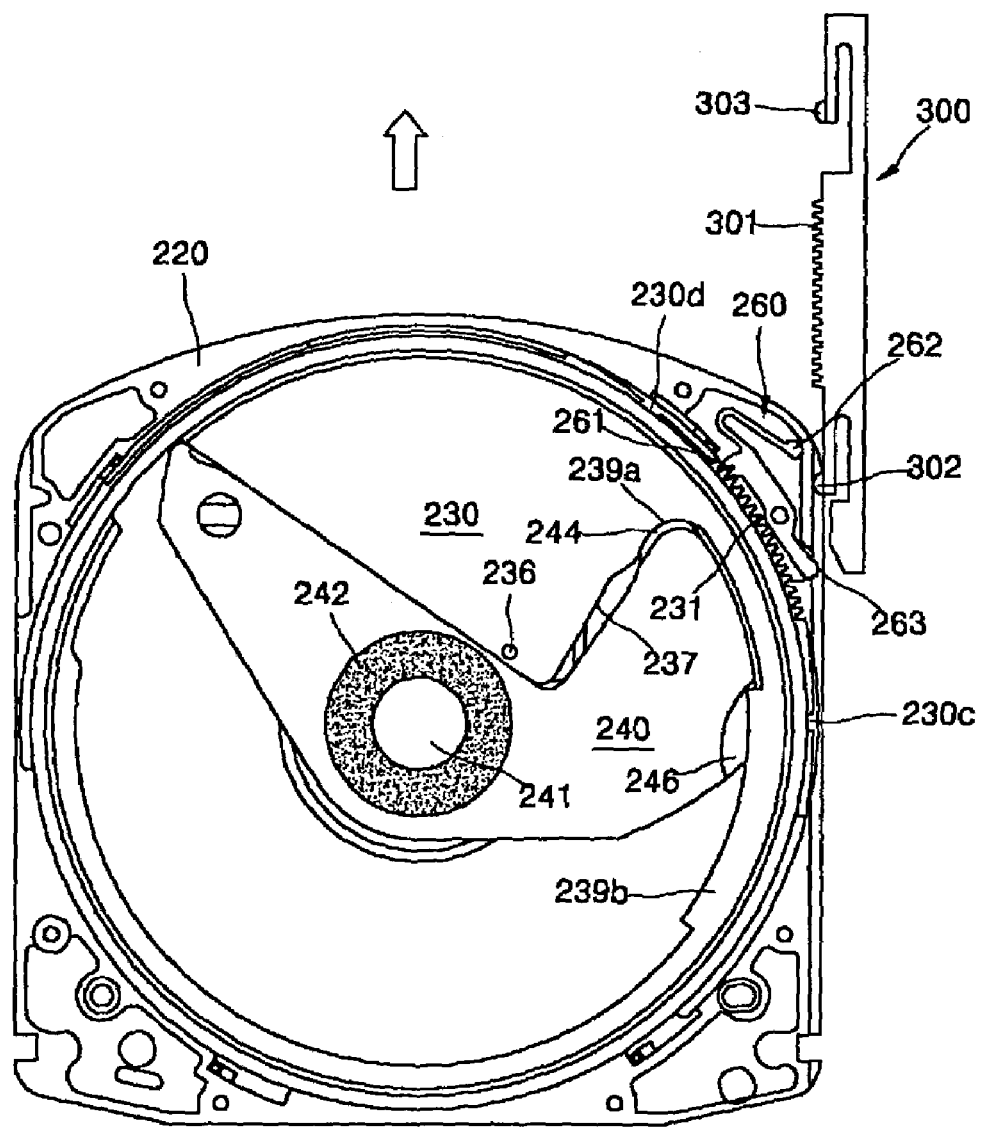
FIGS. 6A through 6D are views showing a state in which a shutter is unlocked and an aperture hole is opened in the disc cartridge shown in FIG. 3.

The gear portion 231 is formed to be engaged with an opening gear 300 (refer to FIG. 6A) installed in the disc drive when the disc cartridge 200 is inserted into the disc drive. Since the opening gear 300 is in a state of being fixed on the disc drive, and the circular shutter member 230 is in a state of being rotatable as shown in FIGS. 6B and 6C, when the opening gear 300 and the circular shutter member 230 are engaged together, the circular shutter member 230 rotates.

Figure 6C:
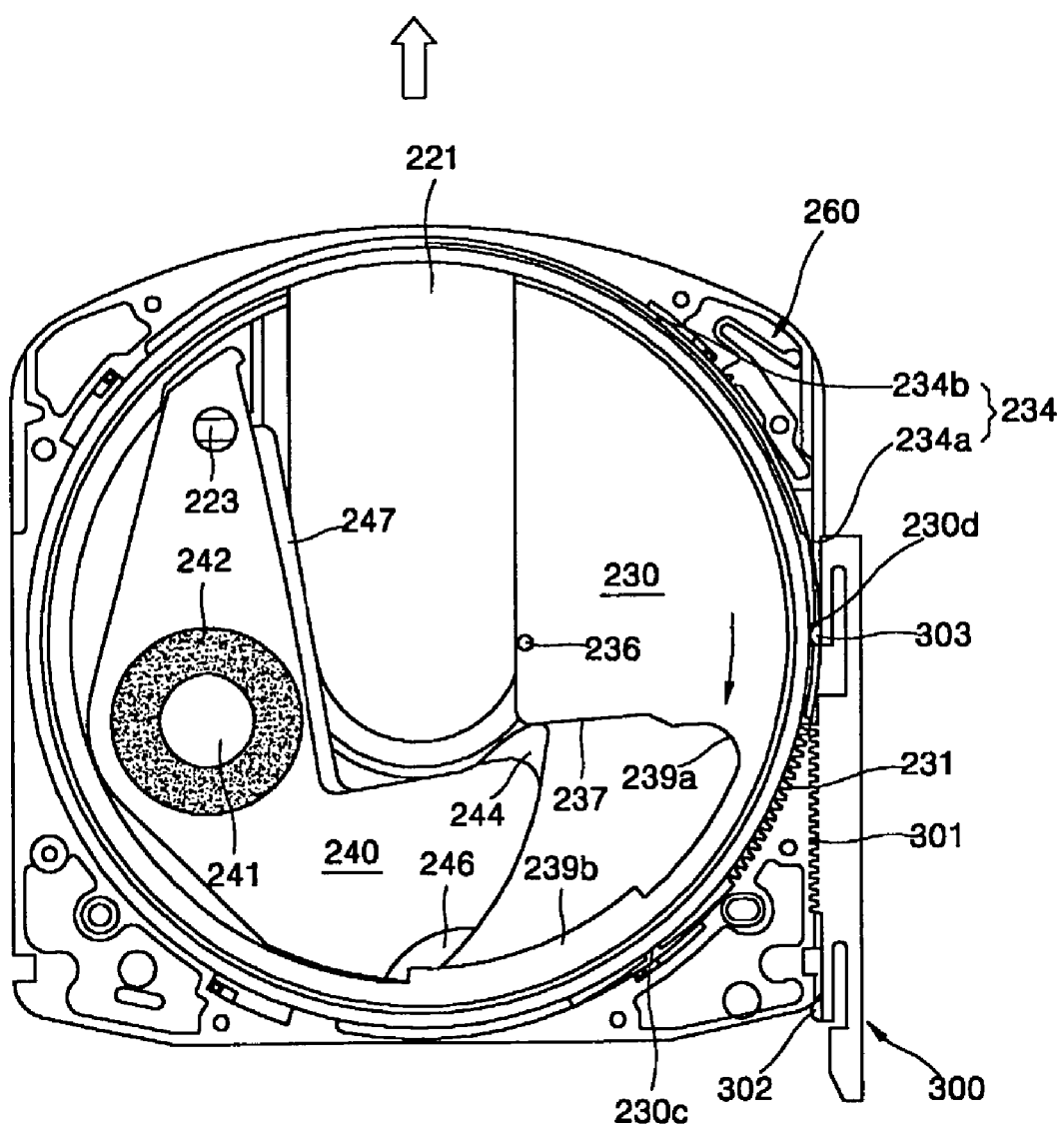
Figure 7A:
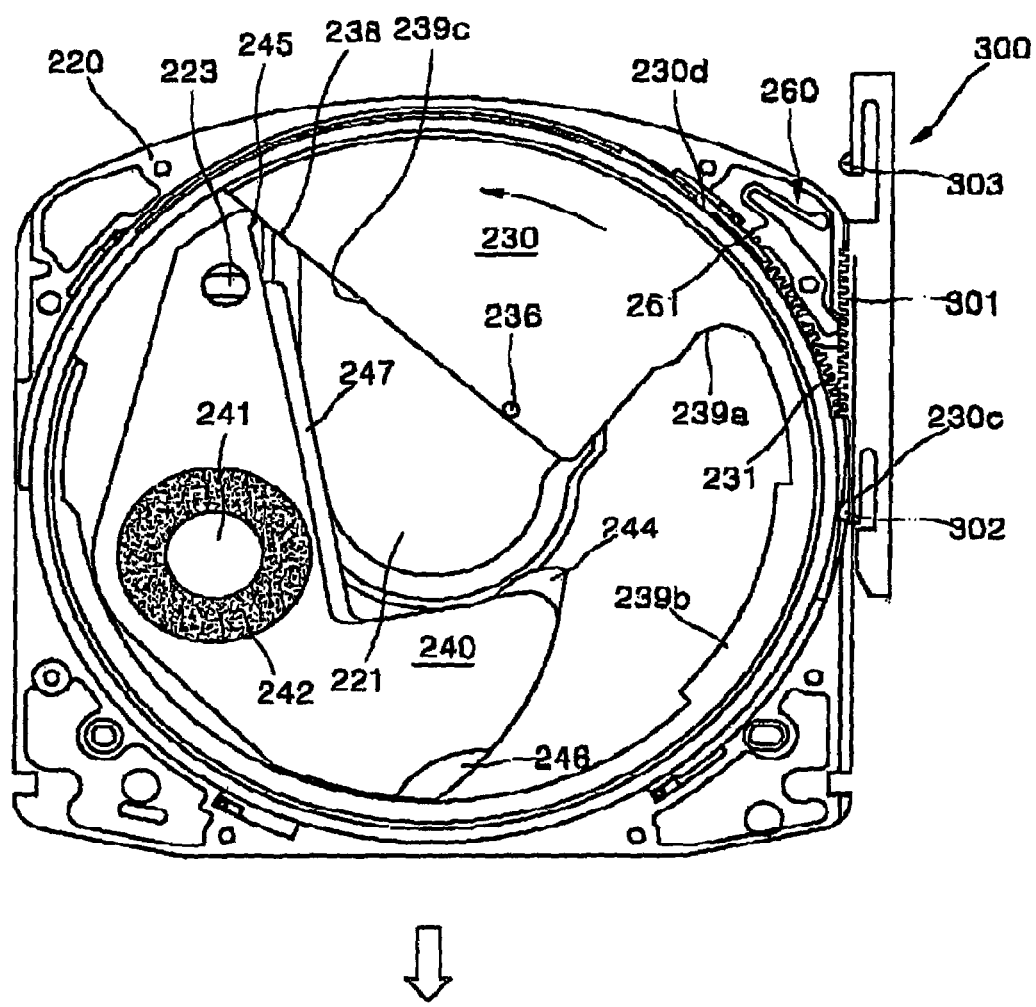
FIGS. 7A and 7B are views showing another state in which the shutter is locked and the aperture hole is closed in the disc cartridge shown in FIG. 3.
Figure 7B:
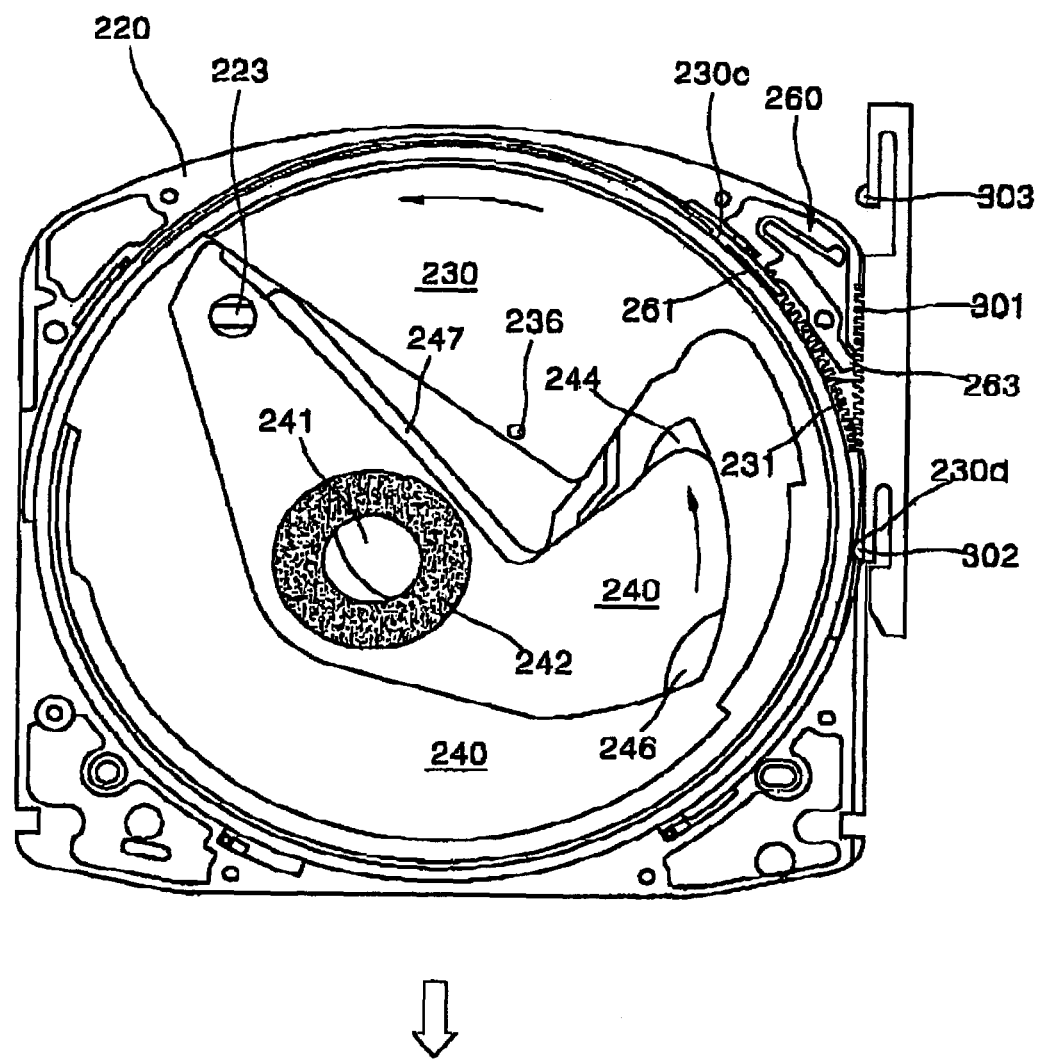

The engagement unit includes first and second push portions 237 and 238 provided at the circular shutter member 230 so that the pivot shutter member 240 can be pushed clockwise and counterclockwise. Thus, in a state in which the aperture hole 221 is closed, as shown in FIG. 6A, as the circular shutter member 230 begins to rotate clockwise, the first push portion 237 pushes a first pressing surface 244 of the pivot shutter member 240 to rotate clockwise. As a result, the aperture hole 221 is opened as shown in FIG. 6C. Then, when the circular shutter member 230 rotates counterclockwise from the above state, as shown in FIG. 7A, the second push portion 238 contacts a second pressing surface 245 of the pivot shutter member 240 and pushes it counterclockwise, as shown in FIG. 7B. As a result, the aperture hole 221 is closed and returns to its original state shown in FIG. 6A.

The locking unit includes a locking lever 260 rotatably installed at the lower case 220. As shown in FIG. 3 and FIGS. 6A through 6D, the locking lever 260 includes a locking protrusion 261 coupled to the gear portion 231, an elastic piece 262 providing an elastic force so that the locking protrusion 261 can be rotated in a direction in which the locking protrusion 261 is coupled to the gear portion 231, and an interference protrusion 263 interfered with the opening gear 300 when the disc cartridge 200 is inserted into the disc drive. Thus, in a state in which an external force is not applied, since the locking protrusion 261 is caught by the gear portion 231 by the elastic force of the elastic piece 262, the circular shutter member 240 cannot be rotated.

Figure 6B:
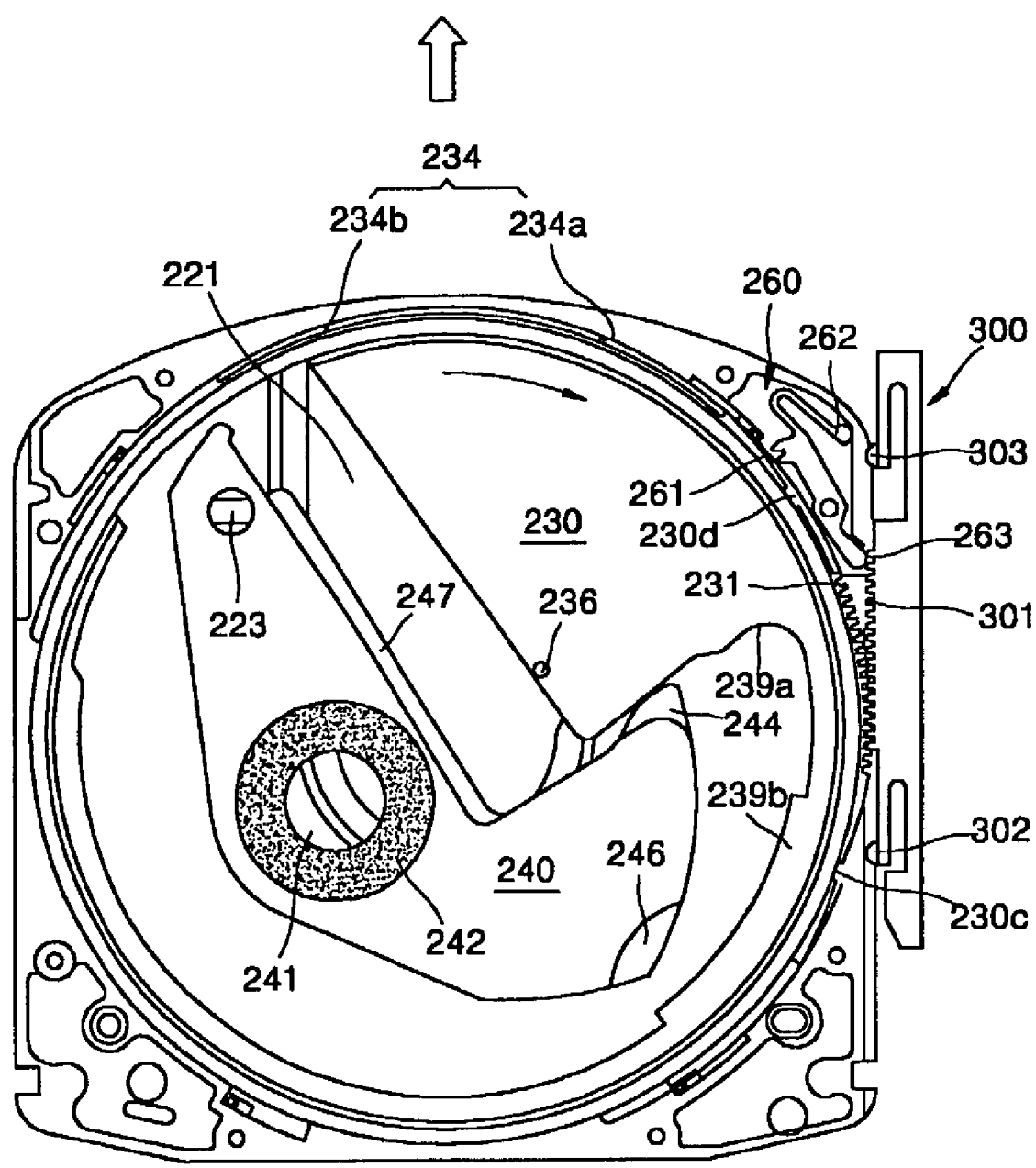
Figure 6D:
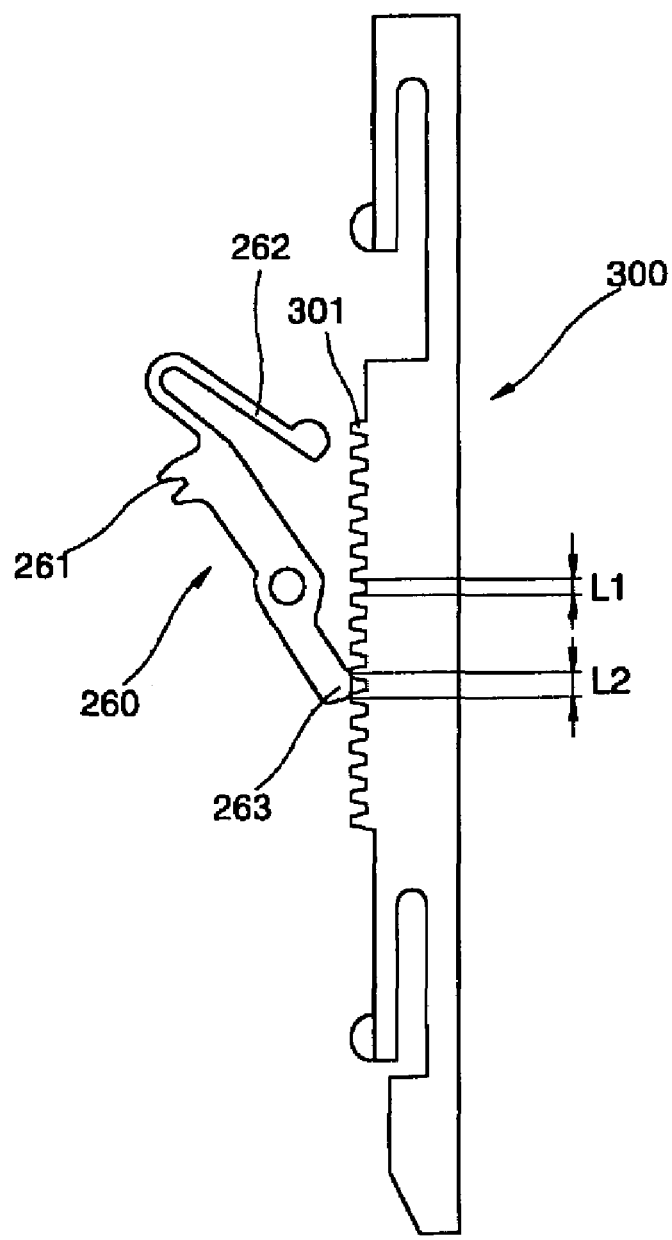

However, when the disc cartridge 200 is inserted into the disc drive, the interference protrusion 263 is interfered with the opening gear 300 to rotate, as shown in FIG. 6B. Then, the locking protrusion 261 is separated from the gear portion 231 so that locking is released, and the circular shutter member 230 becomes rotatable. In this state, as the gear portion 231 and the opening gear 300 are engaged with each other, the circular shutter member 230 is rotated. A gear surface of the opening gear 300 becomes engaged with the gear portion 231. A first hooking protrusion 302 is inserted into a first hooking groove 230c of the circular shutter member 230 at an initial stage in which the disc cartridge 200 is inserted into the disc drive, and the circular shutter member 230 is slightly rotated until the gear surface 301 is engaged with the gear portion 231. A second hooking protrusion 303 restricting a free rotation of the circular shutter member 230 is inserted into a second hooking groove 230d of the circular shutter member 230 when the disc cartridge is completely inserted into the disc drive. Here, a length L2 of a contact surface of the interference protrusion 263 contacting the gear surface 301 of the opening gear 300 is formed to be longer than a length L1 between teeth of the gear surface 301 as shown in FIG. 6D. Otherwise, the interference protrusion 263 is repeatedly caught by the teeth of the gear surface 301 as the gear surface 301 passes, the disc cartridge 200 is not able to be smoothly inserted in the disc drive, and noise is generated due to repeated collisions between the interference protrusion 263 and the teeth of the gear surface 301.

Figure 8A:
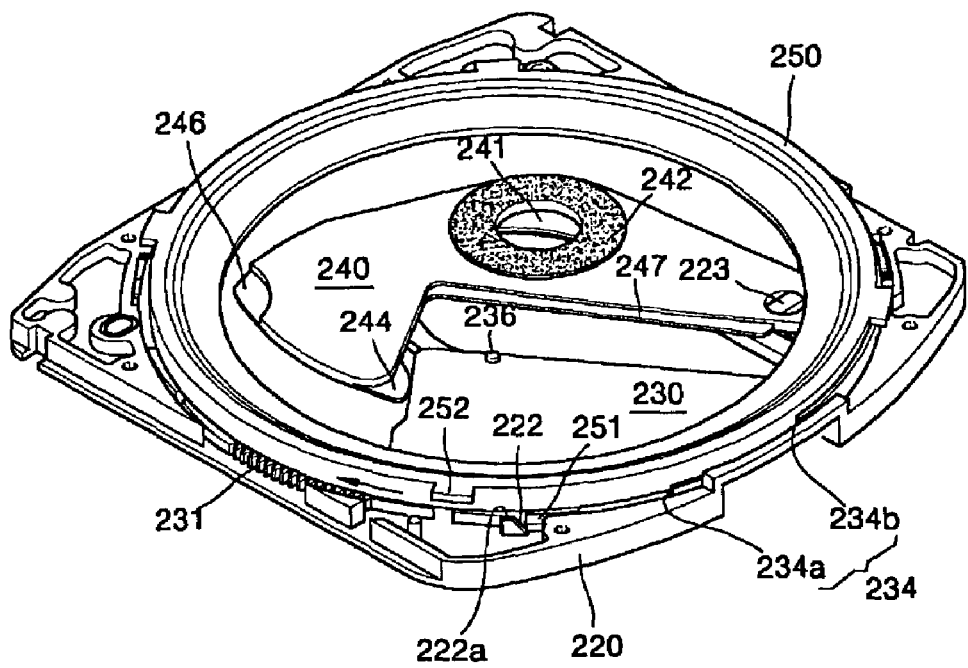
FIGS. 8A and 8B are views showing another state in which the disc holder ascends in the disc cartridge shown in FIG. 3.
Figure 8B:
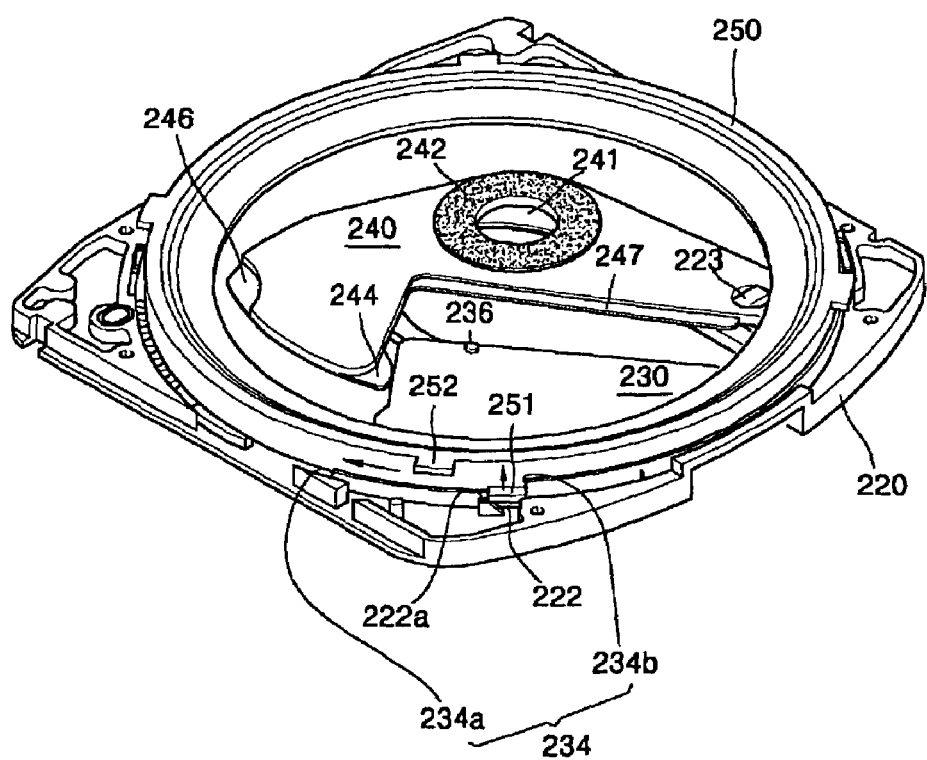
Figure 8C:
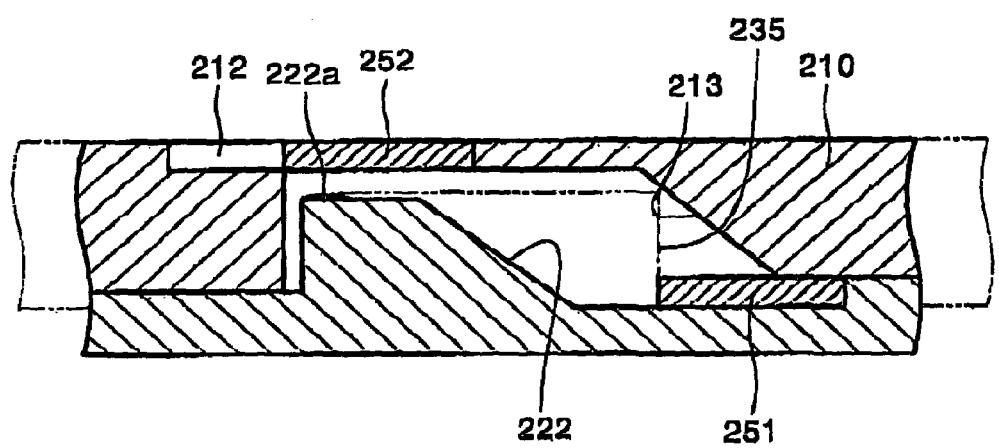
FIGS. 8C and 8D are views showing another state in which the disc holder descends in the disc cartridge shown in FIG. 3.
Figure 8D:
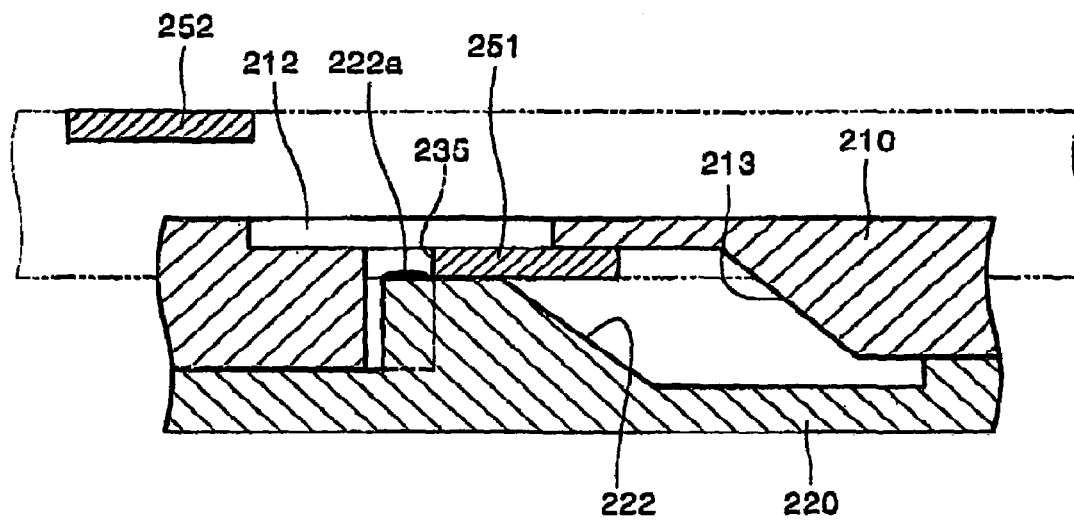

Next, the elevation mechanism as shown in FIGS. 3 and FIGS. 8A through 8D, includes a rib 251 protruding from the disc holder 250, third and fourth push portions 234 and 235 provided at the circular shutter member 230 to rotate the disc holder 250 by pushing the rib 251, and first and second inclined surfaces 222 and 213 provided at the lower and upper cases 220 and 210, respectively, so that, when the disc holder 250 rotates, the rib 251 slides and ascends. Thus, as shown in FIGS. 8A and 8B, when the circular shutter member 230 rotates in a direction in which the aperture hole 221 is open, the third push portion 234 pushes the rib 251 to ascend along the first inclined surface 222. When the circular shutter member 230 rotates in another direction in which the aperture hole 221 is closed, as shown in FIGS. 8C and 8D, the fourth push portion 235 pushes the rib 251 to descend along the second inclined surface 213. Here, the third push portion 234 includes a first push surface 234a pushing the rib 251 to ascend along the first inclined surface 222 as the circular shutter member 230 rotates, and a second push surface 234b allowing the rib 251 to closely contact a stopper 222a provided at an upper end of the first inclined surface 222. Thus, when the circular shutter member 230 rotates, the first push surface 234a first pushes the rib 251 toward the upper end of the first inclined surface 222 and then the second push surface 234b makes the rib 251 closely contact the stopper 222a and locks it not to move.

Meanwhile, a cut groove 212 through which the rib 251 can pass when the disc holder 250 is inserted through the open hole 211, is formed on the upper case 210. An auxiliary rib 252 is provided at the disc holder 250 to block the cut groove 212, as shown in FIG. 8D, when the rib 251 passes through the cut groove 212, rotates, and descends along the second inclined surface 213. Thus, when the disc holder 250 is inserted through the open hole 211, the auxiliary rib 252 is located in the cut groove 212 to block an entrance through which dust can pass. For example, to replace the disc D, the disc holder 250 is disassembled by rotating the disc holder 250 such that the rib 215 fits to the cut groove 212.

Figure 9:
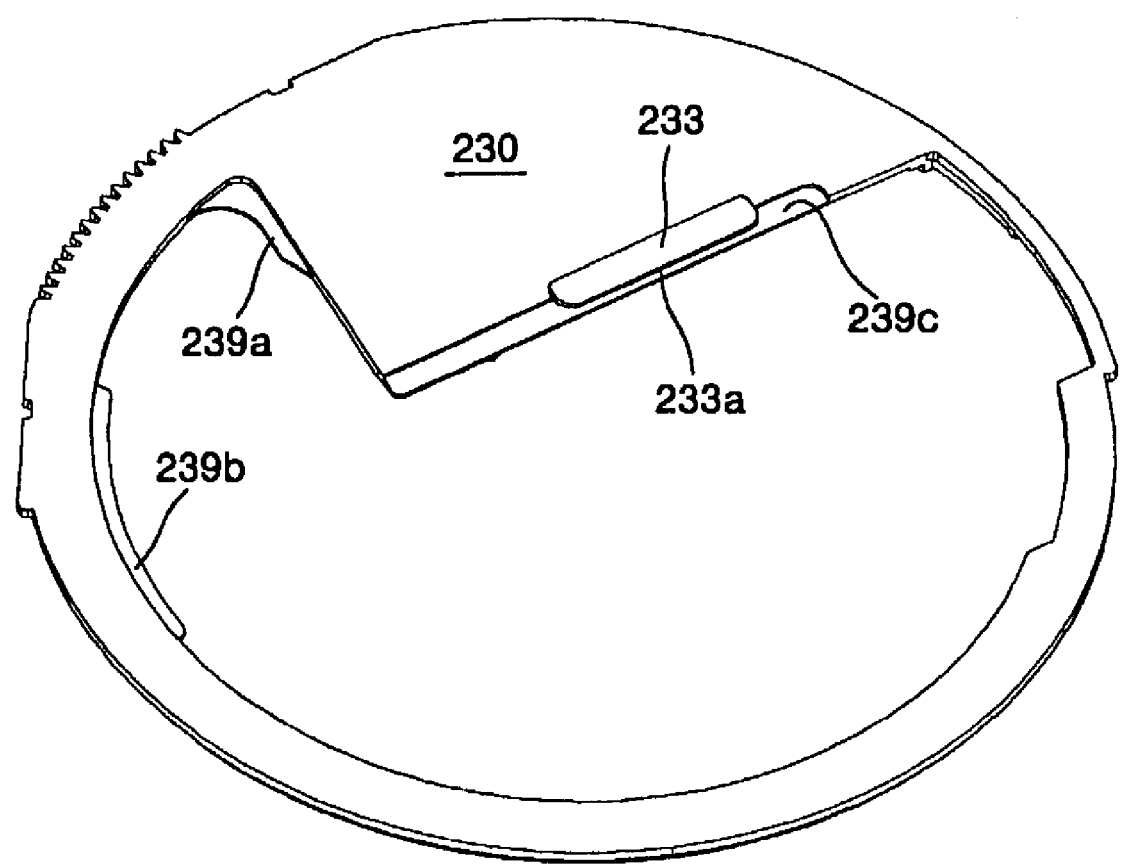
FIG. 9 is a view showing a rear surface of a circular shutter member in the disc cartridge shown in FIG. 3.

Step surfaces 239a, 239b, and 239c, and 244, 246, and 247, vertically folded onto one another are provided at a position where the circular shutter member 230 closely contacts the pivot shutter member 240. The step surface 244 is a first pressing surface pressed by the first push portion 237 as describe above, and also has a function of a step surface to be folded under the step surface 239a. The step surface 246 of the pivot shutter member 240 is disposed under the step surface 239b of the circular shutter member 230. The step surface 247 is disposed under the step surface 239c. Two shutter members 230 and 240, i.e., the circular and pivot shutter members, are folded at several positions to prevent the pivot shutter member 240 lifting during the opening and shutting operations and scratching the recording surface D2 of the disc D and reduce deformation of the shutter when a user presses a shutter through the aperture hole 221. That is, when the circular shutter member 230 and the pivot shutter member 240 closely contact each other as the aperture hole 221 is closed, the circular shutter member 230 and the pivot shutter member 240 are tied together so that, when an external force is applied, the deformation of the shutter is prevented compared to a state in which the circular and pivot shutter members 230 and 240 are separated. Also, a protruding piece 233 is formed at a lower portion of the step surface 239c to form a coupling groove 233a. The step surface 247 is inserted into the coupling groove 233a as a coupling protrusion. The protruding piece 233 provides a function of tying the two shutter members 230 and 240 together with respect to an external force in a vertical direction of the shutter. Also, since the protruding piece 233 protrudes toward the aperture hole 221 and is formed on a rear surface of the shutter as shown in FIG. 9, it provides a function of a handle to rotate the circular shutter member 230 by hooking a finger of a user on the protruding piece 233 when needed. Thus, if the user wants to manually open the shutter, the user rotates the protruding piece 233 by using the finger of the user in a state that the interference piece 263 of the locking lever 260 is pressed.

In the present embodiment, a through hole 253 connected to the open hole 211 is formed on the disc holder 250 so that a damper (not shown) of the disc drive can enter. A connection hole 241 connecting a center hole of the disc D and the aperture hole 221 in a closed state is formed in the pivot shutter member 240. A non-woven fabric 242 enclosing the connection hole 241 and closely contacting a non-information area D1 at an inner circumference side of the disc D is provided. Thus, since the open hole 211 and the aperture hole 221 are formed in the upper and lower cases 210 and 220, respectively, to expose the disc D outside the case, the disc holder 250 blocks a passage of dust that may be introduced toward the recording surface D2 of the disc D through the outer circumference D3 of the disc D. Also, the non-woven fabric 242 blocks a passage of dust that may be introduced toward the recording surface D2 of the disc D between the shutter and the non-information area D1 at the inner circumference side of the disc D. Accordingly, the recording surface D2, that is, an information area, can be protected safely. If the connection hole 241 is not formed on the pivot shutter member 240, the non woven fabric 242 is not needed. In this case, since dust coming through the open hole 211 and the center hole of the disc D may accumulate on the pivot shutter member 240 and contaminate the recording surface during pivot, it is better to form the connection hole 241 to fit the center hole of the disc D.

Figure 10:
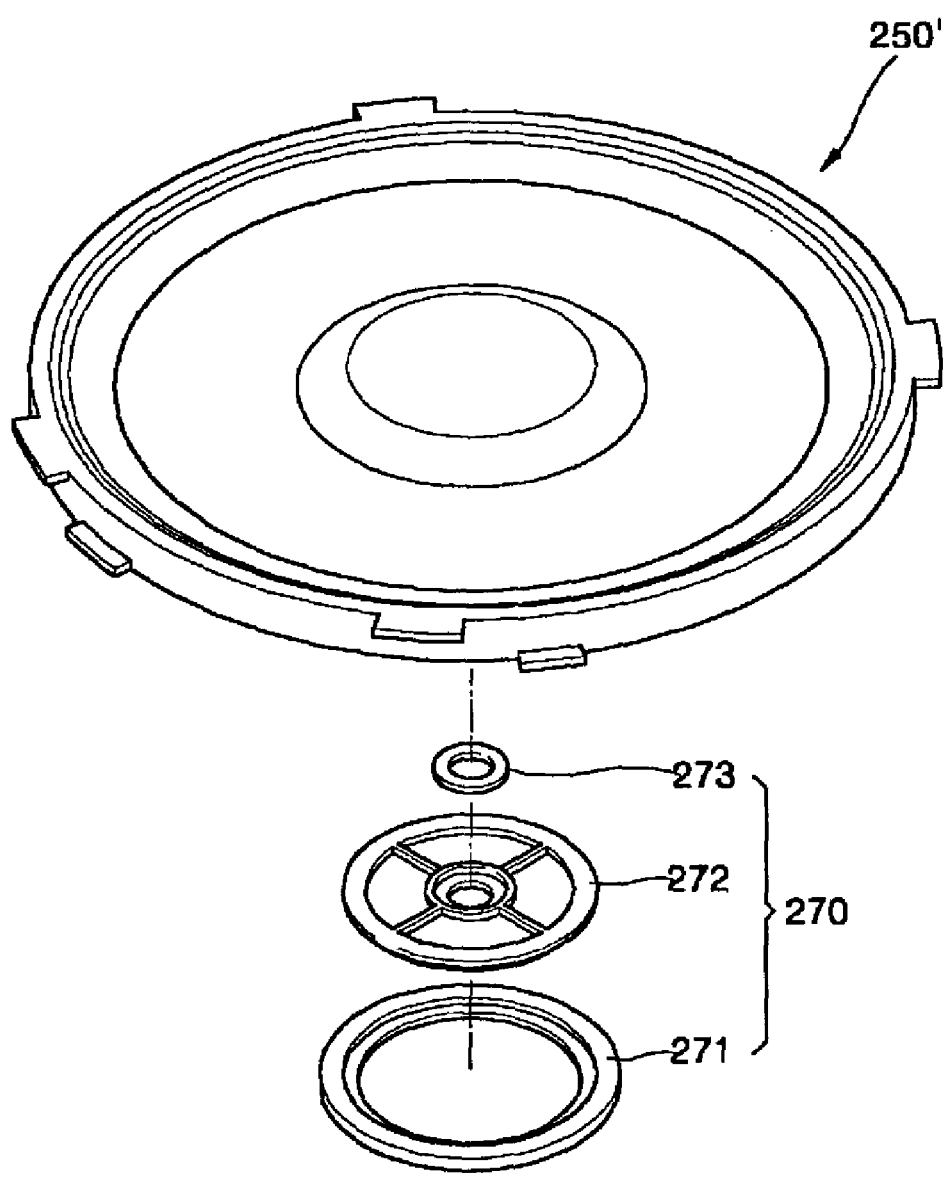
FIG. 10 is a view showing a modified example of the disc holder shown in FIG. 3.

However, when the open hole 211 is blocked, it is possible not to form the connection hole 241 on the pivot shutter member 240. That is, in the present embodiment, although the through hole 253 is formed on the disc holder 250 so that the damper of the disc drive can enter, the disc cartridge 200 may adopt a disc holder 250' having no hole, such as the through hole 241, as shown in FIG. 10, and it is possible to block a shutter side to prevent contamination by dust. Instead, in this case, since the damper of the disc drive cannot enter the disc D, a clamping member 270 must be installed at an inner side of the disc holder 250' as shown in FIG. 10. The clamping member 270 includes a ring member 271 installed at the inner surface of the disc holder 250', a clamping holder 272 supported by an outer circumference of the ring member 271, and an iron piece (yoke) 273 installed at the clamping holder 272 to generate a magnetic attraction with a magnet installed at a turntable (not shown) in the disc drive to clamp the disc D.

Reference numeral 236 denotes a protrusion protruding from the circular shutter member 230 to support the non-information area D1 at the inner circumference side of the disc D and having a function of preventing contact between the shutter and the recording surface D2 of the disc D.

The disc cartridge 200 accommodating the disc D is inserted into the disc drive in a state in which the circular shutter member 230 and the pivot shutter member 240 block the aperture hole 221 as shown in FIG. 6A and the disc holder 250 covers the gap g between the outer circumference D3 of the disc and the outer circumference 230b of the circular shutter member 230 as shown in FIG. 5A. That is, all passages through which dust can be introduced toward the recording surface D2, that is, the information area, of the disc D accommodated in the disc cartridge 200, are blocked. When the disc cartridge 200 is inserted, as shown in FIG. 6B, the opening gear 300 installed at the disc drive presses the interference protrusion 263 of the locking lever 260 to unlock the locking protrusion 261 and the gear portion 231. Next, the first hook protrusion 302 of the opening gear 300 is caught by the first hooking groove 230c of the circular shutter member 230. When the disc cartridge 200 is inserted into the disc drive in this state, the gear surface 301 of the opening gear 300 is engaged with the gear portion 231 of the circular shutter member 230 to rotate the circular shutter member 230 clockwise as shown in FIG. 6C. Here, since only the outer circumference D3 of the disc D contacts the accommodation surface 232 of the circular shutter member 230, the information area of the recording surface D2 of the disc D is hardly damaged during an shutter opening/shutting operation.

Figure 5B:
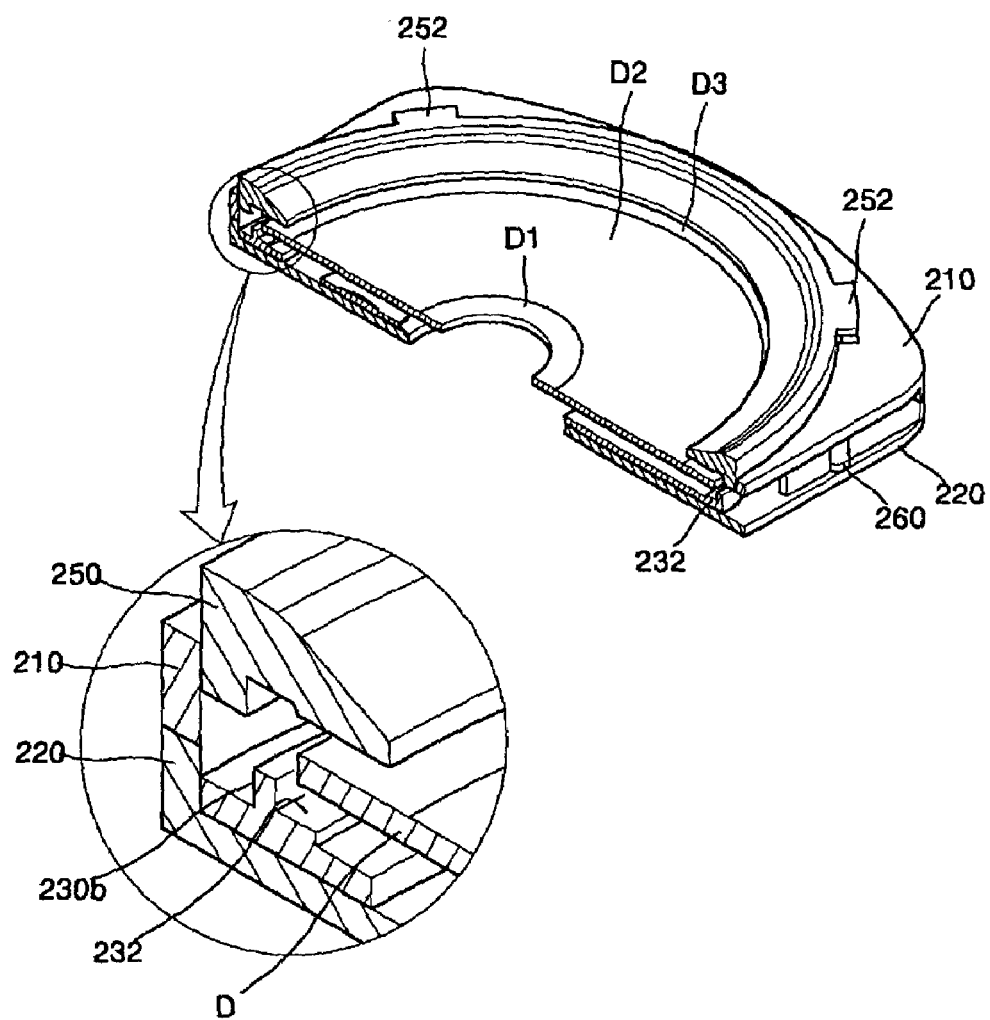

As the circular shutter member 230 rotates, the aperture hole 221 is opened and simultaneously the disc holder 250 ascends. That is, as the circular shutter member 230 rotates, as shown in FIGS. 6B and 6C, the first push portion 237 pushes the first pressing surface 244 of the pivot shutter member 240 to pivot in the same direction and open the aperture hole 221. Also, in this process, as shown in FIGS. 8A and 8B, the third push portion 234 pushes the rib 251 of the disc holder 250 to ascend toward the upper end of the first inclined surface 222. Thus, as shown in FIG. 5B, the disc holder 250 is separated from the disc D and the disc D can rotate freely. In this state, the turntable and the damper of the disc drive enter the aperture hole 221 and the first connection hole 253, respectively, to clamp the disc D and then recording and reproducing operations are performed with respect to the disc D as the turntable rotates. In the meantime, a first height by which the disc holder 250 separated from the disc D ascends, is designed to be double a second height by which the disc D disposed on the turntable ascends. That is, when the disc D is clamped, it is raised toward the clamper by the turntable about 1 mm from the accommodation surface 232. Thus, to prevent interference with the disc D, the first height by which the disc holder 250 ascends, is set to be about 2 mm that is double the second height.

In contrast, when the recording/reproducing operation is completed, the turntable and the damper escape from the disc cartridge 200 and clamping is removed. In this state, as the disc cartridge 200 is ejected from the disc drive, the circular shutter member 230 and the pivot shutter member 240 return to their original positions and the aperture hole 221 is closed. That is, as shown in FIGS. 7A and 7B, the gear portion 231 of the circular shutter member 230 is engaged with the gear surface 301 of the opening lever 300 in an opposite direction to the above-described case in which the disc cartridge 200 enters the disc drive, and rotates counterclockwise. Here, the second push portion 238 pushes the rib 251 to descend along the second pressing surface 245 so that the pivot shutter member 240 rotates to the original position in which the aperture hole 221 is closed. Here, since the closing operation is performed in a state in which only the outer circumference D3 of the disc D contacts the accommodation surface 232, the information area D2 is safely kept. Also, in this process, as shown in FIGS. 8C and 8D, the fourth push portion 235 pushes the rib 251 to descend along the second inclined surface 213 of the upper case 210. Consequently, as shown in FIGS. 5A and 6A, the aperture hole 221 is closed by the shutter 230 and 240 and the gap g between the outer circumference D3 of the disc D and the outer circumference 230b of the circular shutter member 230 is covered by the disc holder 250 so that the recording surface D2, that is, the information area, is safely protected from a foreign material, such as dust. Thus, since all passages through which the dust can be introduced toward the recording surface D2, are blocked when the disc cartridge 200 is ejected from the disc drive, the information area can be prevented from contamination when the disc D is kept in the disc cartridge 200.

In the above shutter closed state, since the step surfaces 239a, 239b, and 239c, and 244, 246, and 247 of the circular shutter member 230 and the pivot shutter member 240 are vertically folded onto corresponding ones, when the circular and pivot shutter members 230 and 240 are pressed inward the cases 210 and 220 through the aperture hole 221, they are not easily pushed. Thus, the deformation of the circular and pivot shutter members 230 and 240 by the external force can be prevented, and also the closed state of the aperture hole 221 can be firmly maintained.

Figure 11:
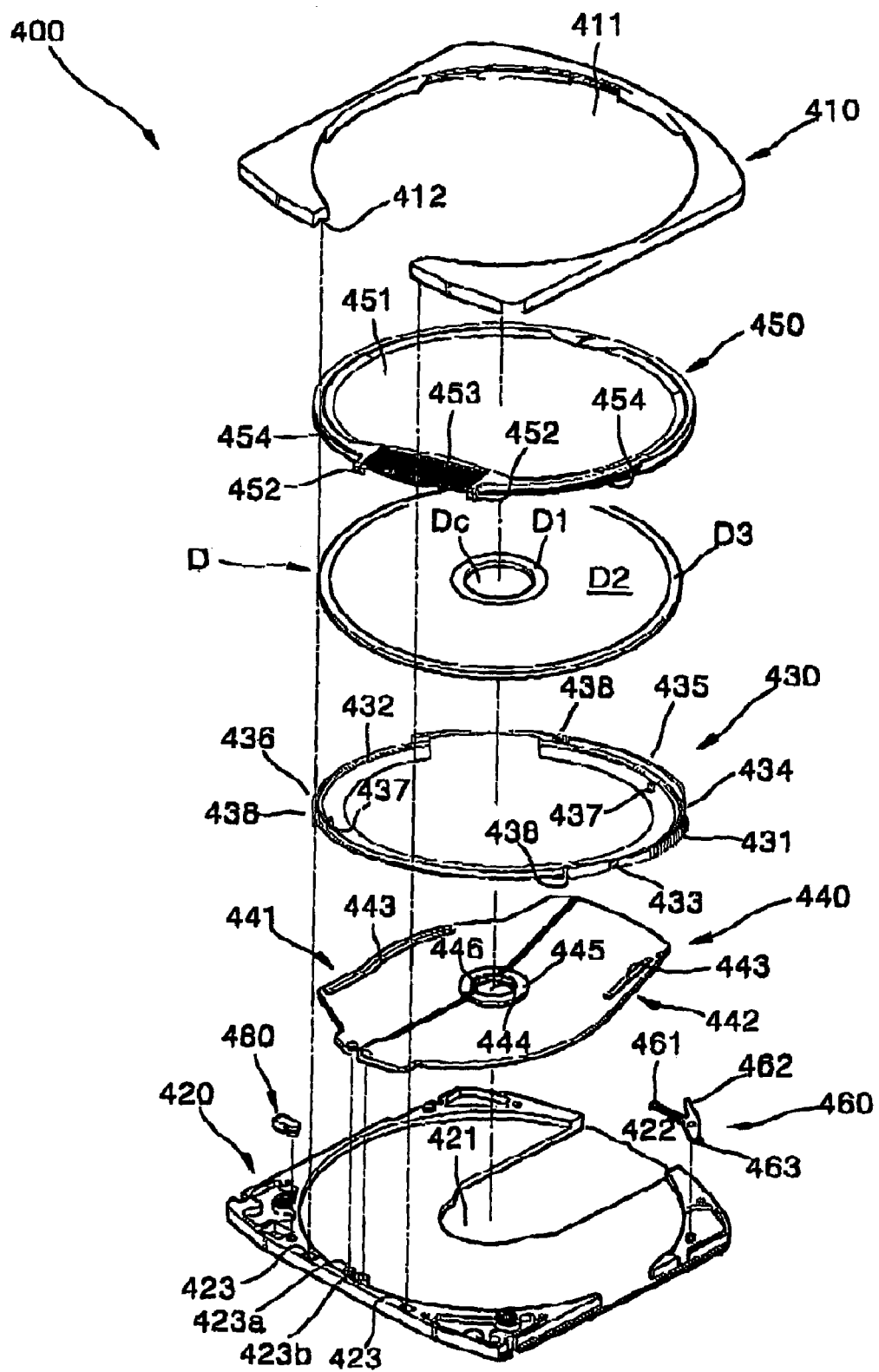
FIG. 11 is an exploded perspective view of a disc cartridge according to another embodiment of the present invention.

Next, FIG. 11 shows a disc cartridge 400 according to another embodiment of the present invention. The disc cartridge 400 includes a case having upper and lower cases 410 and 420 accommodating a disc D therebetween, a ring rotator 430 having an accommodation surface 432 on which an outer circumference D3 of the disc D is disposed, and rotatably installed inside the upper and lower cases 410 and 420, a shutter 440 opening/shutting an aperture hole 421 formed on the lower case 420 under the disc D, and a disc holder 450 installed in the upper and lower cases 410 and 420 to elevate. The shutter 440 and the disc holder 450 respectively perform opening/shutting and elevating operations by being engaged with the ring rotator 430 and the detailed descriptions thereof will be made later.

The case includes the lower case 420 where the aperture hole 421 is formed and the upper case 410 where an open hole 411 open to an outside of the case is formed and which is coupled to the lower case 420.

The shutter 440 is installed to rotate around rotation shafts 423a and 423b provided at the lower case 420 and includes first and second shutter members 441 and 442 opening the aperture hole 421 through a gap that is formed when they are separated from each other.

Figure 15A:
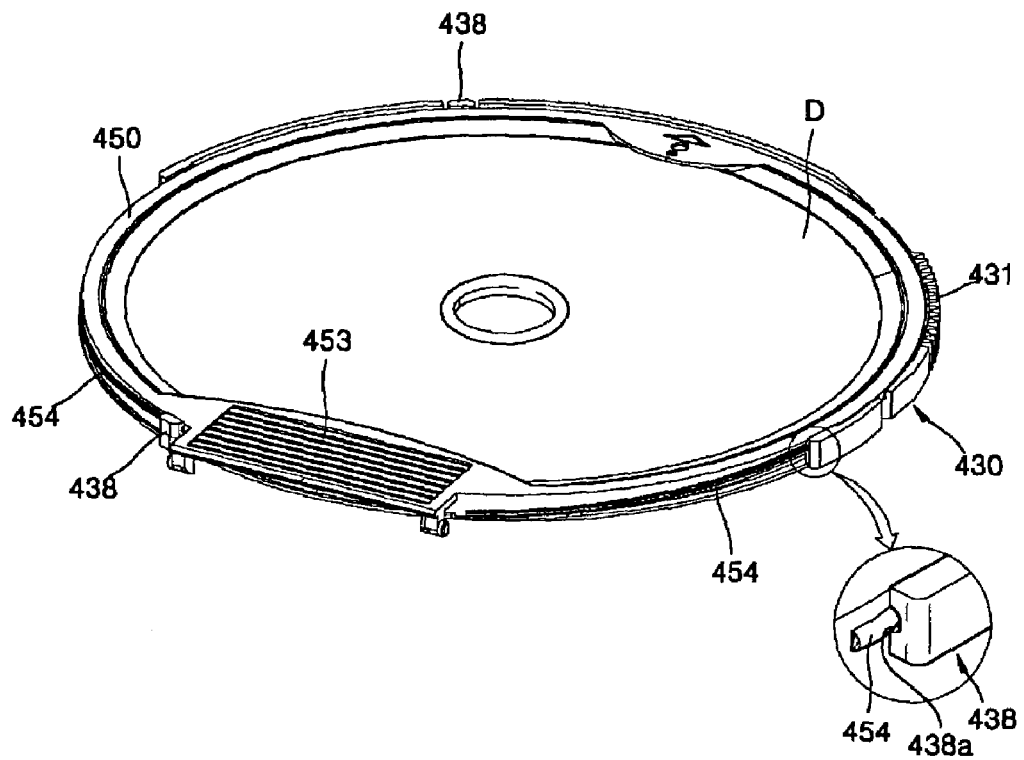
FIGS. 15A and 15B are views showing a state in which the disc holder descends, in disc cartridge shown in FIG. 11.
Figure 15B:
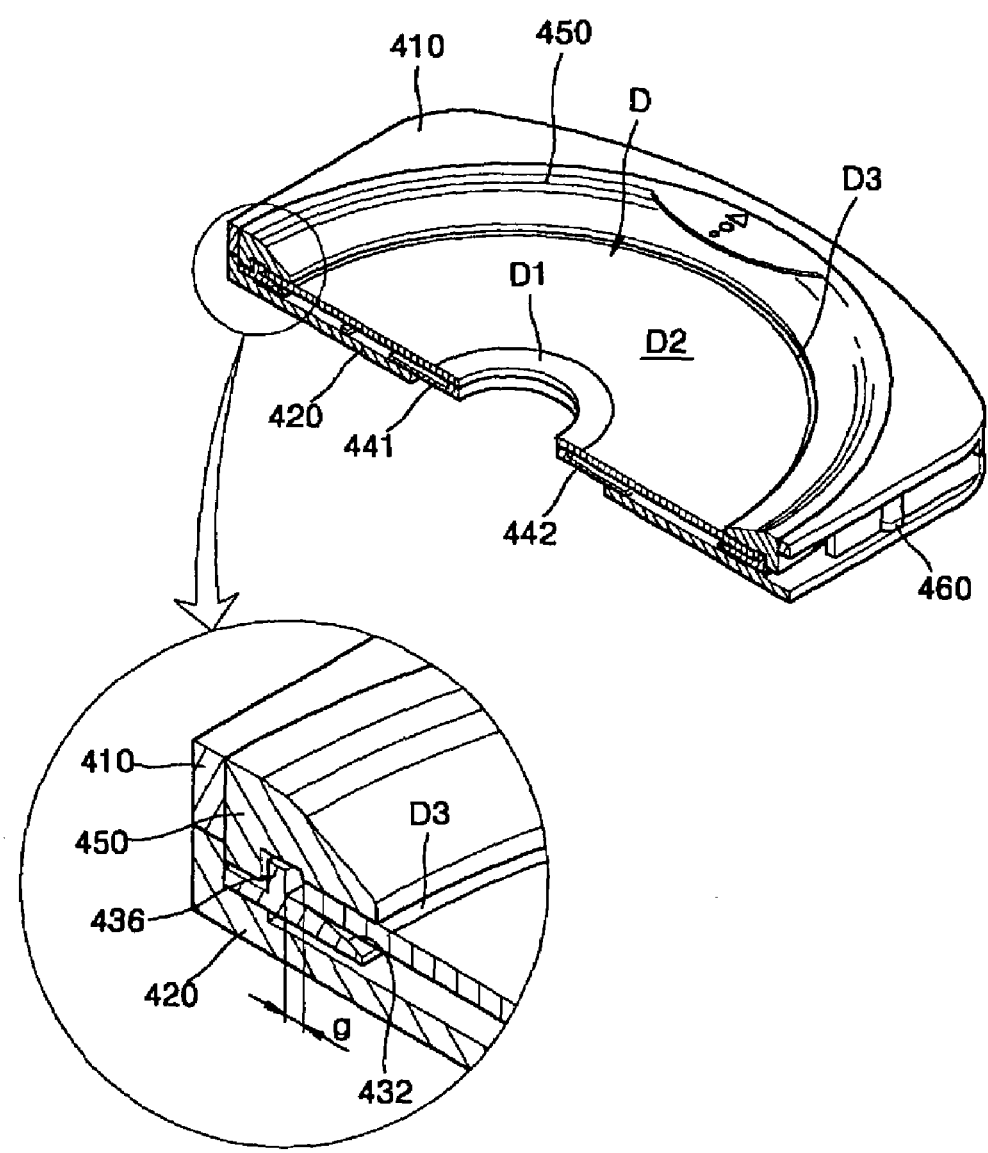

The disc holder 450 ascends when the disc cartridge 400 is inserted into a disc drive (not shown) and descends when the disc cartridge 400 is ejected therefrom. When being lowered, the disc holder 450 closely contacts the outer circumference D3 of the disc D and an outer circumference 436 of the ring rotator 430 as shown in FIG. 15B. The disc holder 450 functions as a cover to prevent contamination of a recording surface (information area) D2 of the disc D by dust introduced through the open hole 411 and accumulating in a gap g between the outer circumference 436 of the ring rotator 430 and the outer circumference D3 of the disc D as shown in FIG. 15B. In other words, an interval between the outer circumference D3 of the disc D and an inner surface defining the open hole 411 is covered to prevent the dust from being introduced therein. Since the disc holder 450 presses the disc D toward the accommodation surface 432 of the ring rotator 430 during descending, the disc holder 450 has a function of firmly holding the disc D not to move with respect to the case. The disc holder 450 has a ring shape in which a through hole 451 having a diameter greater than that of a non information area D1 at an inner circumference side of the disc D and less than that of an outermost circumference of the disc D is formed at a center thereof. Thus, when the disc holder 450 closely contacts an circumference of an upper surface of the disc D, the upper surface of the disc D at an inner side of the through hole 451 is exposed through the open hole 411.

Figure 12A:
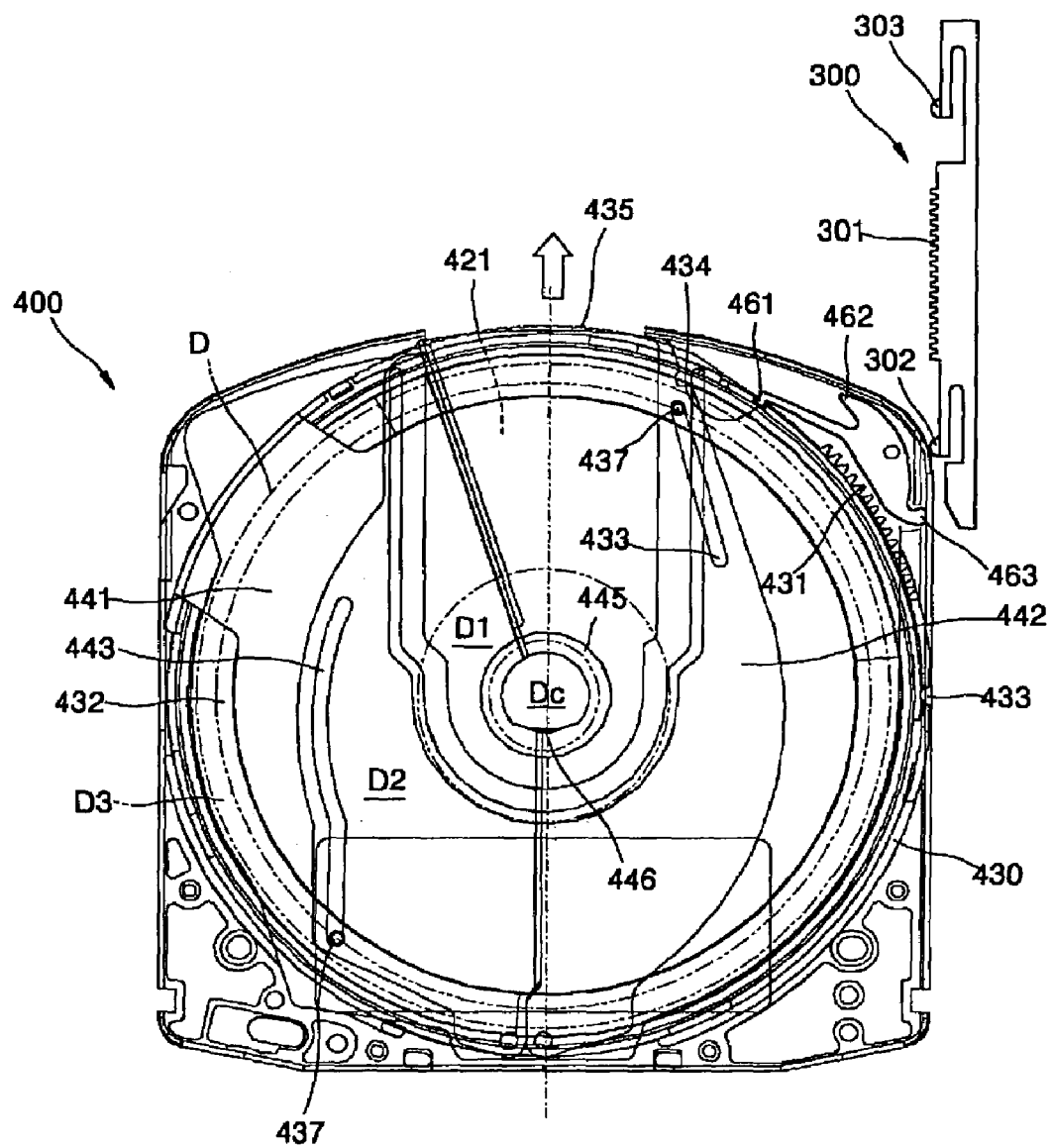
FIGS. 12A and 12B show opening and shutting operations of a shutter in the disc cartridge shown in FIG. 11.
Figure 12B:
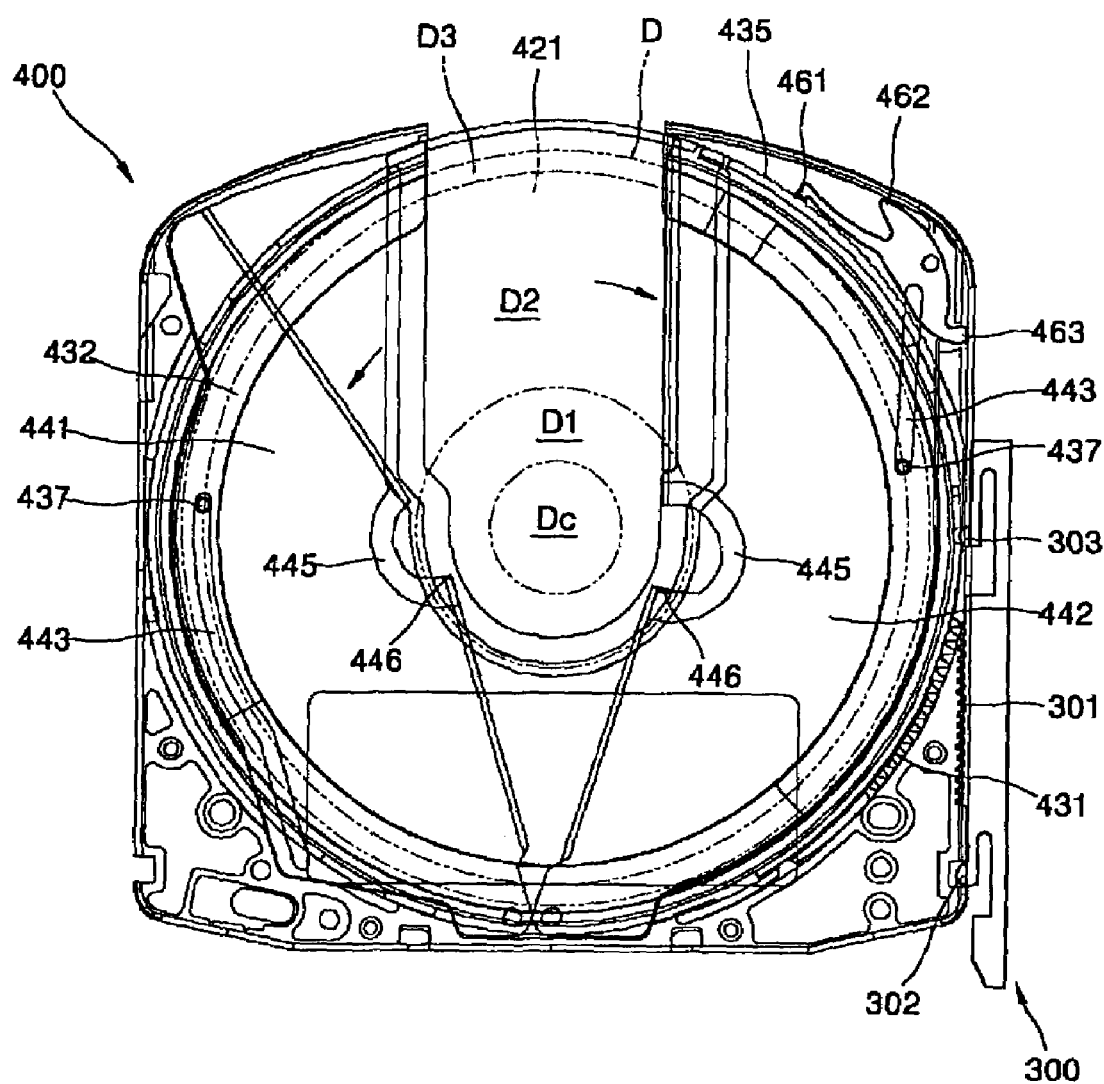

Next, a rotation driving mechanism rotating the ring rotator 430 includes a gear portion 431 provided at the ring rotator 430 and a locking unit selectively locking the ring rotator 430. The gear portion 431 is formed to be engaged with the opening gear 300 (refer to FIG. 12A) installed in the disc drive when the disc cartridge 400 is inserted into the disc drive. Since the opening gear 300 is in a fixed state, and the ring rotator 430 is in a rotatable state, when the opening gear 300 and the ring rotator 430 are engaged with each other, the ring rotator 430 rotates as shown in FIG. 12B when the disc cartridge 400 enters the disc drive. The locking unit includes a locking lever 460 rotatably installed at the lower case 420. The locking lever 460, as shown in FIGS. 11, 12A, and 12B, includes a locking protrusion 461 coupled to a second hooking groove 434 provided at the ring rotator 430, an elastic piece 462 providing an elastic force to rotate the locking protrusion 461 in a direction in which the locking protrusion 461 is coupled to the second hooking groove 434, and an interference protrusion 463 interfering with the opening gear 300 when the disc cartridge 400 is inserted into the disc drive. Thus, in a state in which an external force is not applied to the locking lever 460, since the locking protrusion 461 is caught by the second hooking groove 461 by the elastic force of the elastic piece 462, the ring rotator 430 cannot rotate. However, when the disc cartridge 400 is inserted into the disc drive, the interference protrusion 463 is interfered with the opening gear 300 to rotate the locking lever 460. Then, the locking protrusion 461 is released from the second hooking grove 461 to remove the locking state, so that the ring rotator 430 can be rotated. In this state, the gear portion 431 is engaged with the opening gear 300 so that the ring rotator 430 is rotated. The opening lever 300 includes a gear surface 301 engaging the gear portion 431, a first hooking protrusion 302 inserted into a first hooking groove 433 of the ring rotator 430 at an initial stage in which the disc cartridge 400 is inserted into the disc drive to slightly rotate the ring rotator 430 until the gear surface 301 is engaged with the gear portion 431, and a second hooking protrusion 303 restricting a free rotation of the ring rotator 430 by being inserted into the second hooking groove 434 of the ring rotator 430 when the disc cartridge 400 is completely inserted into the disc drive.

Figure 13:
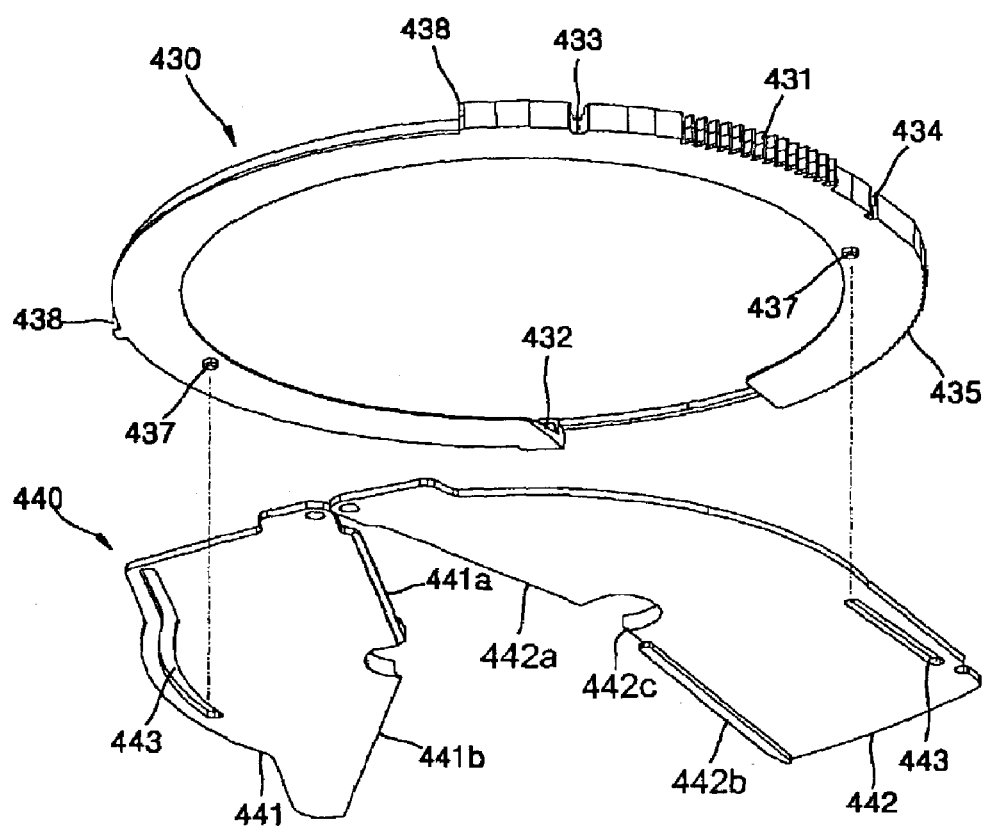
FIG. 13 is a view showing an engagement of a ring rotator and the shutter in the disc cartridge shown in FIG. 11.

A first engagement mechanism opening/shutting the first and second shutter members 441 and 442 by a rotation of the ring rotator 430 as shown in FIGS. 11 through 13, includes engagement slots 443 formed on the first and second shutter members 441 and 442, and engagement protrusions 437 protruding from the ring rotator 430 and slidably inserted into corresponding ones of the engagement slots 443. Thus, as the ring rotator 430 begins to rotate clockwise in a state in which the aperture hole 421 is closed, as shown in FIG. 12A, the engagement protrusions 437 push inner wall surfaces of the engagement slots 443 to rotate, and finally the aperture hole 421 is opened as shown in FIG. 12B. When the ring rotator 420 rotates counterclockwise in this state, the aperture hole 421 returns to a closed state as shown in FIG. 12A.

Figure 14:
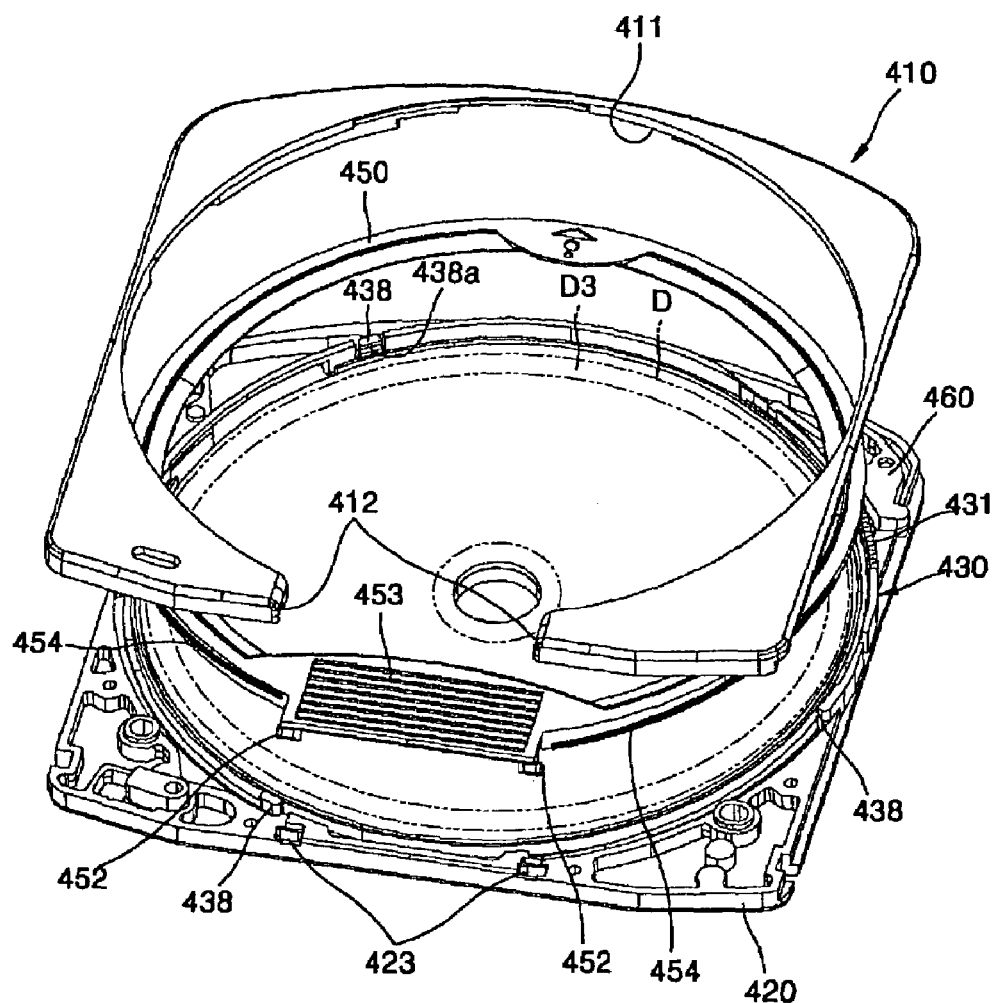
FIG. 14 is a view showing a structure of installation of a disc holder and the shutter in the disc cartridge shown in FIG. 11.
Figure 16A:
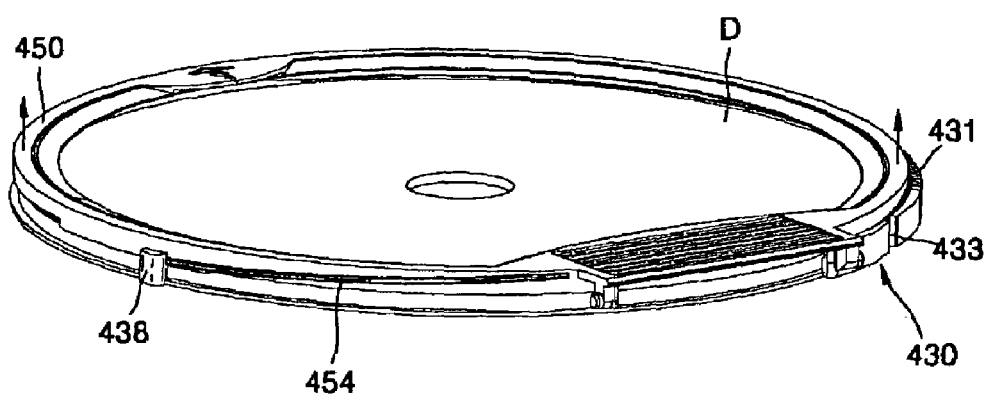
FIGS. 16A and 16B are views showing another state in which the disc holder ascends, in disc cartridge shown in FIG. 11.
Figure 16B:
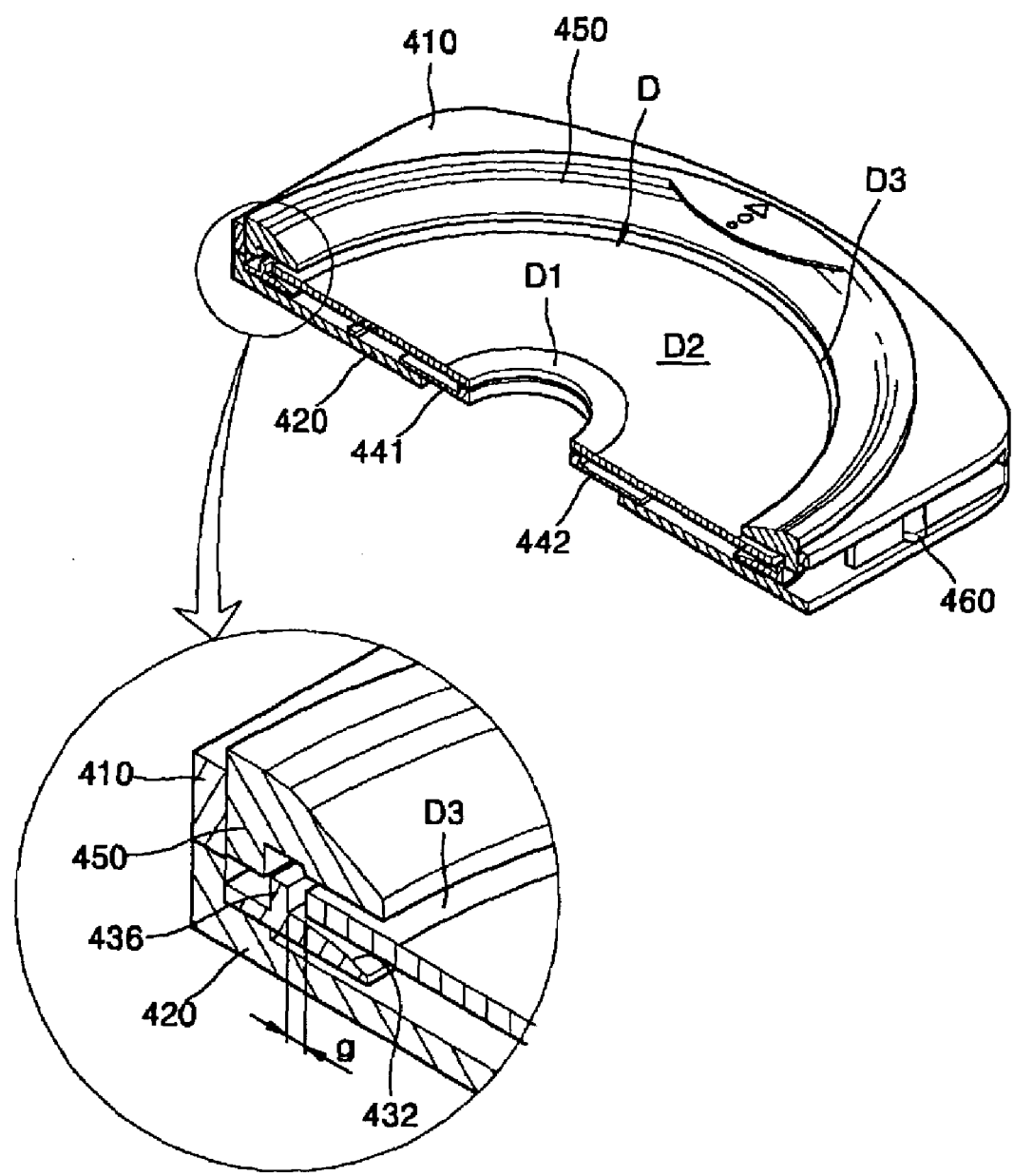

Next, a second engagement mechanism elevating the disc holder 450 according to the rotation of the ring rotor 430 as shown in FIGS. 11 and 14, includes an inclined rail 454 spirally formed on an outer circumferential surface of the disc holder 450, and a support member 438 provided at the ring rotator 430 and slidably coupled to the inclined rail 454. Thus, when the ring rotator 430 rotates, a guide groove 438a of the support member 438 slides along the inclined rail 454. Here, the disc holder 450 ascends along a spiral track of the inclined rail 454. That is, when the ring rotator 430 rotates counterclockwise on the drawing, that is, in a direction in which the aperture hole 421 is closed, in a state in which the disc holder 450 closely contacts the disc D, as shown in FIG. 15A, the guide groove 438a of the support member 438 moves from an uppermost end of the spiral inclined rail 454 to a lowermost end thereof. Accordingly, the disc holder 450 installed to elevate relatively to the ring rotator 430 ascends as much as a difference in height between the uppermost end and the lowermost end of the inclined rail 454 as shown in FIG. 16A. In contrast, when the ring rotator 430 rotates clockwise on the drawing, that is, in a direction in which the aperture hole 421 is closed, the guide groove 438a of the support member 438 moves toward the uppermost end from the lowermost end of the inclined rail 454 to lower the disc holder 450, thus returning to an original state shown in FIG. 15A. When the disc holder 450 ascends as described above and shown in FIG. 16A, the disc D is released to be free to rotate as shown in FIG. 16B. When the disc holder 450 descends as described above and shown in FIG. 15A, the disc holder 450 closely contacts the outer circumference D3 of the disc D and the outer circumference 436 of the ring rotator 430 so that introduction of dust through a gap g and a free movement of the disc D are prevented.

Figure 17:
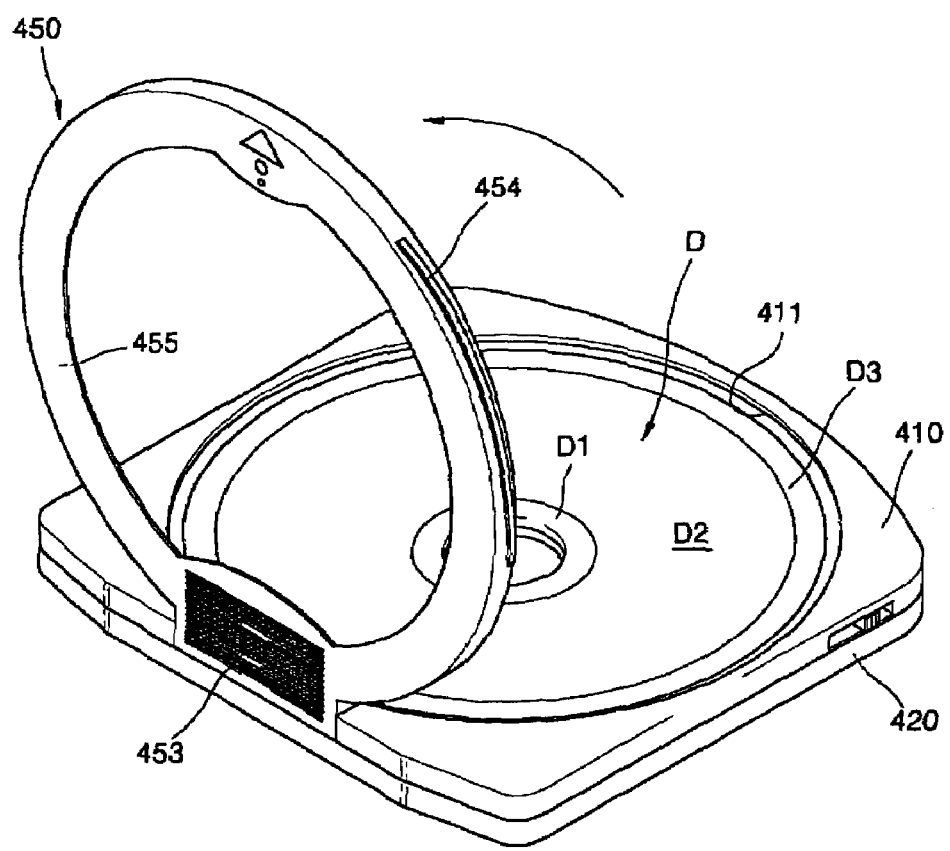
FIG. 17 is a view showing another state in which the disc holder is rotated out of the open hole, in the disc cartridge shown in FIG. 11.
Figure 18:
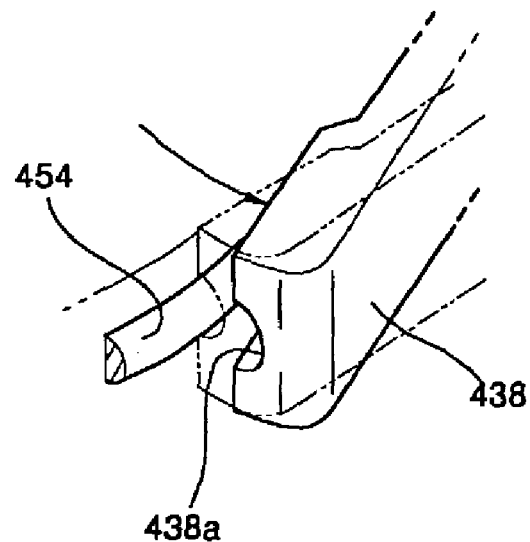
FIG. 18 is a view showing a process in which a support member coupled to an inclined rail is elastically separated, in the disc cartridge shown in FIG. 11.

As shown in FIGS. 11 and 14, shaft support grooves 423 into which shaft members 452 of the disc holder 450 are inserted to move up and down, is formed on the lower case 420. Shaft cover portions 412 disposed above the shaft support grooves 423 to prevent escape of the shaft members 452 through the open hole 411 are formed at the upper case 410. Thus, each shaft member 452 is pivotably supported between the shaft support groove 423 and the shaft cover portion 412 . To pick out the disc D from the cases 410 and 420, the disc holder 450 is vertically rotated around one of the shaft members 452 to be out of the open hole 411. Then, the outer circumference D3 of the disc D and a contact surface 455 of the disc holder 450 are separated so that the disc D can be picked out from the cases 410 and 420 through the open hole 411 as shown in FIG. 17. Of course, since the inclined rail 454 of the disc holder 450 is caught by the guide groove 438a of the support member 438, the disc holder 450 may be slightly restricted when it is vertically rotated. However, as shown in FIG. 18, by slightly separating the support member 438 from the inclined rail 454 using an elastic force, the disc holder 450 can be easily lifted from the ring rotator 430. Reference numeral 453 of the disc holder 450 denotes a grip portion having a plurality of grooves so that a user can easily hold it with fingers. The grip portion 453 can be used as a mark of an upper side of the disc holder 450.

Figure 19:
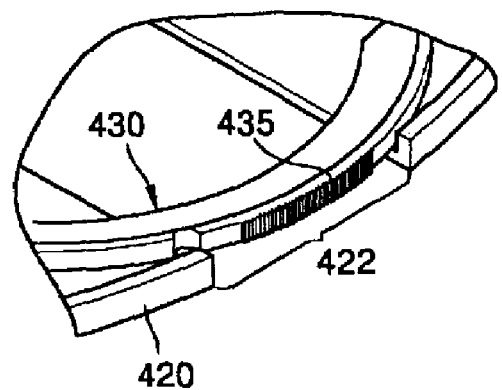
FIG. 19 is a view showing a state in which a groove of a ring rotator is exposed through an exposing portion of a case, in the disc cartridge shown in FIG. 11.

Step surfaces 441a and 441b, and 442a and 442b vertically folded onto each other as shown in FIG. 13 are provided at a position where the first and second shutter members 441 and 442 closely contact each other. The two shutter members 441 and 442 are folded onto each other at several positions to prevent the first and second shutter members 441 and 442 raised during opening and shutting operations from scratching a recording surface (information area) D2 of the disc D, and to reduce deformation when a user presses the shutter 440 through the aperture hole 421. That is, when the first and second shutter members 421 and 422 closely contact each other during closing the aperture hole 421, the first and second shutter members 421 and 422 are tied together so that, when an external force is applied, the deformation of the shutter 440 is prevented compared to a state in which the shutter members 421 and 422 are separated. Also, a protruding piece 442c is provided on the lower surface of the second shutter member 422. The protruding piece 422c protrudes toward the aperture hole 421 as seen from a rear surface thereof and provides a function of a handle so that the user can rotate the second shutter member 422 using a finger. Thus, the shutter 440 can be manually opened by rotating the shutter 440 by catching the protruding piece 442c using a finger in a state in which the interference piece 463 of the locking lever 460 is pressed. In this case, the aperture hole 421 is manually opened by directly rotating the shutter 440. Alternatively, the shutter 440 can be manually opened using the first engagement mechanism by rotating the ring rotator 430. That is, a groove 435 exposed outside through an exposing portion 422 of the lower case 420 is formed at one side of the outer circumference surface of the ring rotator 430 as shown in FIG. 19. Thus, after pressing the interference piece 463 of the locking lever 460 and rotating the ring rotator 430 while pushing the groove 435 with the user's finger, the shutter 440 is open by using the first engagement mechanism of the engagement protrusion 437 and the engagement slot 443. Here, the groove 435 restricts slipping of the finger along an outer circumferential surface of the ring rotator 430.

Figure 20:
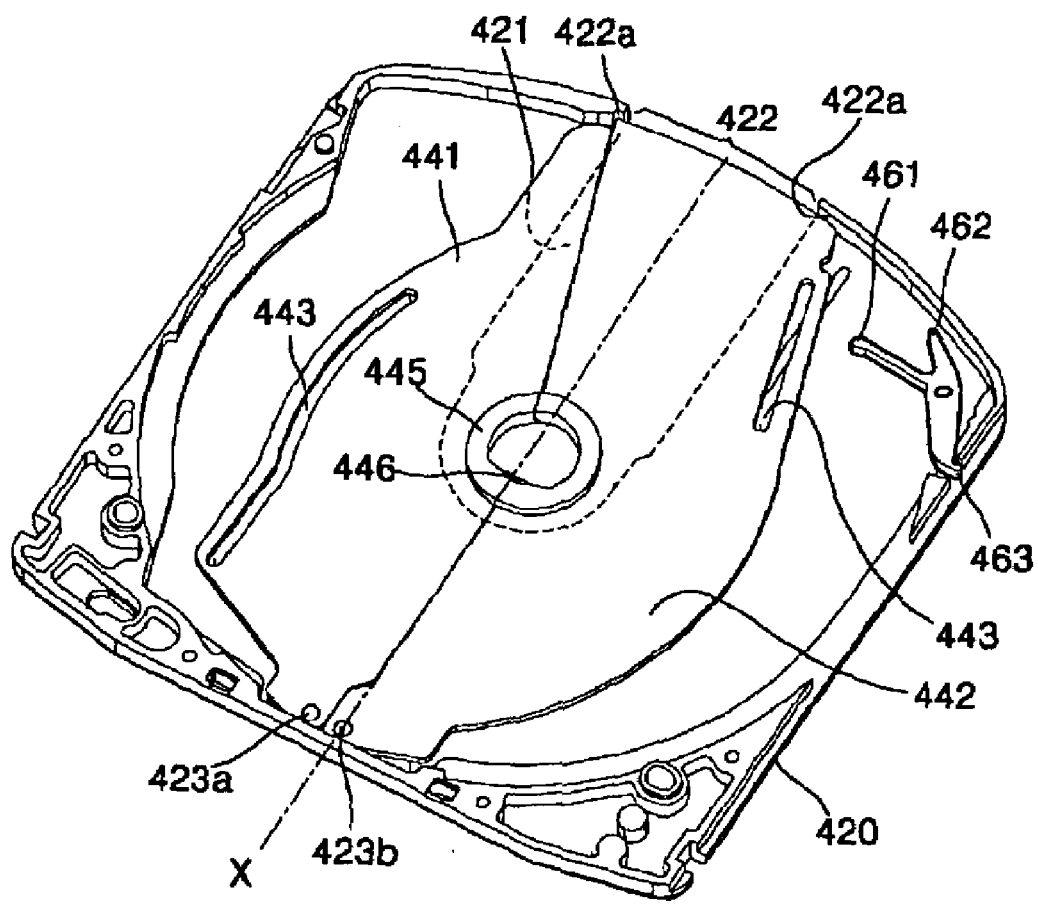
FIG. 20 is a view explaining a relationship between the shutter and the exposing portion in the disc cartridge shown in FIG. 11.

In the meantime, as shown in FIG. 20, the second shutter member 442 of the shutter 440 blocks the exposing portion 422 under the disc holder 450. Thus, by setting a length and a curvature of the second shutter member 442 such that the rotation shaft 423b of the second shutter member 442 is disposed on a center line X of the lower case 420, and an end portion of the second shutter member 442 can contact a wall surface 422a adjacent to the exposing portion 422, introduction of the dust through the exposing portion 422 toward the recording surface D2 of the disc D when the aperture hole 421 is closed can be reduced.

Referring back to FIG. 11, the through hole 451 connected to the open hole 411 is formed in the disc holder 450 so that the damper (not shown) of the disc drive can enter. A connection hole 444 connecting a center hole Dc of the disc D and the aperture hole 421 in a closed state, and a raised surface 445 encompassing the connection hole 444 and closely contacting the non-information area D1 at the inner circumference side of the disc D, are formed on the first and second shutter members 441 and 442. Thus, although the open hole 411 and the aperture hole 421 are formed in the upper and lower cases 410 and 420, respectively, and the disc D accommodated therein is exposed to the outside, since the disc holder 450 blocks a passage through which dust is introduced toward the recording surface (area) D2 from the outer circumference D3 of the disc D, and the raised surface 445 blocks another passage through which the dust is introduced toward the recording surface D2 between the non information area D1 at the inner circumference side of the disc D and the first and second shutter members 441 and 442, the recording surface D2, that is, the information area, can be safely protected.

A protrusion 446 further protrudes from the raised surface 445 to contact the non-information area D1 at the inner circumference side of the disc D. When the shutter 440 is closed, the protrusion 446 is disposed in the center hole Dc of the disc D as shown in FIG. 12A, and does not show any special function. However, when the shutter 440 is open, the protrusion 446 supports the non-information area D1 at the inner circumference side of the disc D as shown in FIG. 12B. This is to prevent the raised surface 445 from scratching the recording surface D2 of the disc D when the first and second shutter members 441 and 442 are opened.

Figure 21:
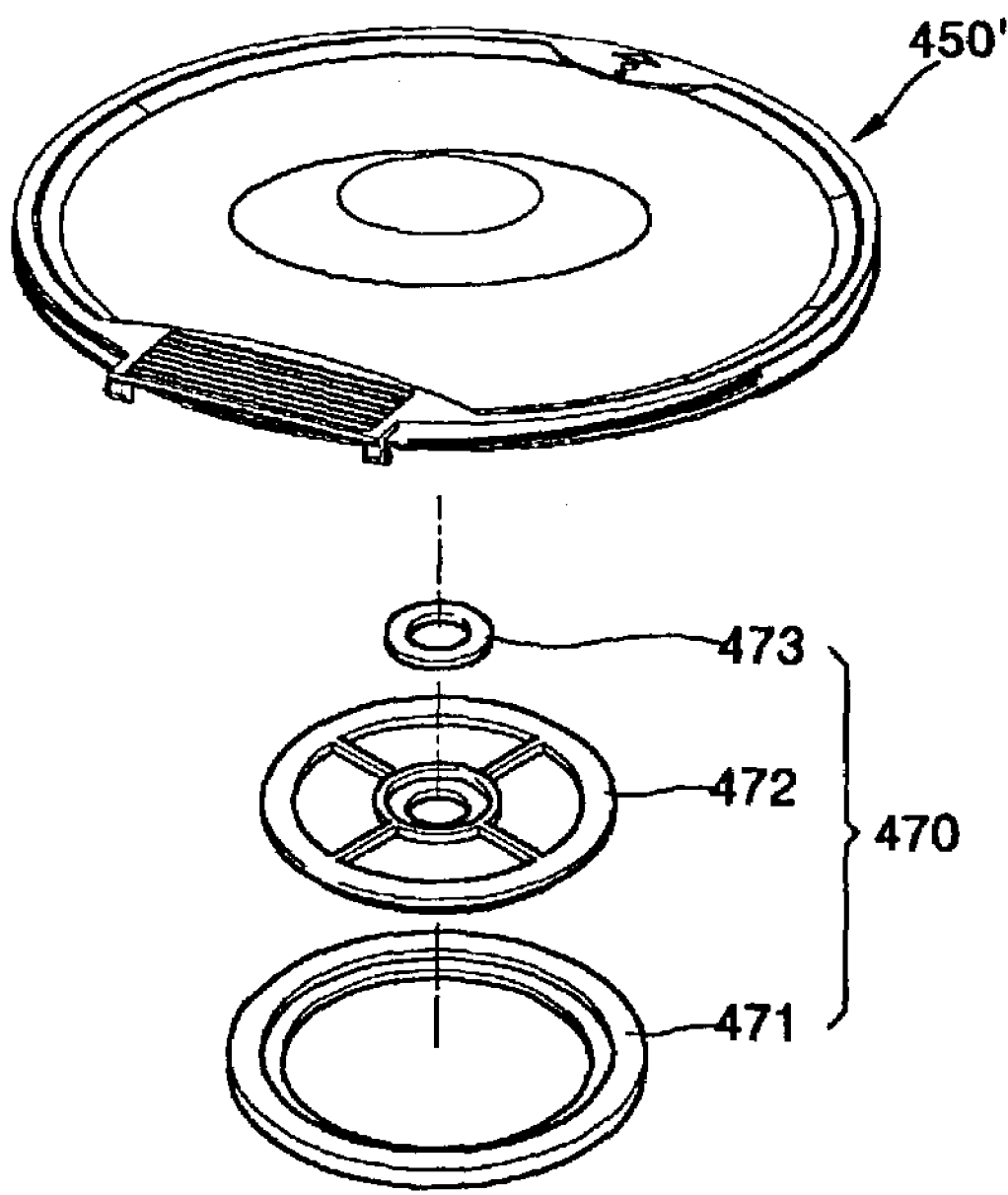
FIG. 21 is a view showing an example of modification of the disc holder shown in FIG. 11.

In the present embodiment, when the upper case 410 is not formed with the open hole 411, it is effective not to form the connection hole 444 in the shutter 400 to prevent contamination by dust. Instead, in this case, since the damper of the disc drive cannot enter as described above, as shown in FIG. 21, a clamping member 470 must be installed at an inner surface of the disc holder 450'. The clamping member 470 includes a ring member 471 installed at the inner surface of the disc holder 450', a clamping holder 472 supported by an outer circumference of the ring member 471, and an iron piece (yoke) 473 installed at the clamping holder 472 to generate a magnetic attraction with a magnet installed at a turntable (not shown) in the disc drive to clamp the disc D. However, in this case, since information printed on an upper surface of the disc D cannot be seen, a member covering the open hole 411 or the through hole 451 is formed of a transparent material so that the upper surface of the disc D can be seen. Reference number 480 of FIG. 11 denotes a write protector movably or slidably mounted on the lower case 420 to prevent a processor from writing data on the disk D or to allow the processor to write the data on the disk D according to a write or non-write protected cartridge disposed on the shutter 440.

The disc cartridge 400 containing the disc D is inserted into the disc drive in a state in which the first and second shutter members 441 and 442 block the aperture hole 421 as shown in FIG. 12A, and the disc holder 450 covers the gap g between the outer circumference D3 of the disc D and the outer circumference 436 of the ring rotator 430 as shown in FIG. 15B. That is, all passages through which dust can be introduced toward the recording surface D2 of the disc D accommodated in the disc cartridge 400, that is, the information area, are blocked. When the disc cartridge 400 is inserted, the opening gear 300 installed at the disc drive presses the interference protrusion 463 of the locking lever 460, and the locking lever 460 is rotated so that the locking protrusion 461 and the second hooking groove 434 are unlocked. Next, the first hooking protrusion 302 of the opening gear 300 is caught by the first hooking groove 433 of the ring rotator 430. When the disc cartridge 400 continues to enter the disc drive in this state, the gear surface 301 of the opening gear 300 is engaged with the gear portion 431 of the ring rotator 430 so that the ring rotator 430 returns to the state shown in FIG. 12B. Here, since only the outer circumference D3 of the disc D contacts the accommodation surface 432 of the ring rotator 430, the information area D2 of the recording surface is hardly damaged during the shutter opening/shutting operation.

As the ring rotator 430 rotates, the opening operation of the aperture hole 421 and the ascending operation of the disc holder 450 are simultaneously performed by the first and second engagement mechanism. That is, when the ring rotator 421 rotates, the engagement protrusions 437 push the corresponding inner wall surfaces of the engagement slots 443 to rotate the first and second shutter members 441 and 442 in a direction in which they are separated from each other. Thus, the aperture hole 421 is opened through a gap made between the first and second shutter members 441 and 442. Also, in this process, as shown in FIG. 16A, the guide groove 438a of the support member 438 slides along the inclined rail 454 and pushes the disc holder 450 to ascend. Thus, as shown in FIG. 16B, the disc holder 450 is separated from the disc D so that the disc D can freely rotate. In this state, the turntable (not shown) and the damper (not shown) of the disc drive enter the aperture hole 421 and the open hole 411, respectively, to clamp the disc D. Thus, a recording/reproducing operation is performed with respect to the disc D as the turntable rotates. In the meantime, a first height by which the disc holder 450 separated from the disc D ascends is designed to be double a second height that the disc D accommodated on the turntable ascends. That is, when the disc D is clamped, it is raised toward the damper by the turntable about 1 mm from the accommodation surface 432. Thus, to prevent an interference with the disc D, the first height that the disc holder 450 ascends is set to be about 2 mm that is double the second height.

In contrast, when the recording/reproducing operation is completed, the turntable and the damper escape from the disc cartridge 400 and clamping is removed. In this state, as the disc cartridge 400 is ejected from the disc drive, the ring rotator 430 returns to the original position and the aperture hole 421 is closed. That is, the gear portion 431 of the ring rotator 430 is engaged with the gear surface 301 of the opening lever 300 in an opposite direction to the above-described case of entering, and rotates counterclockwise. Here, the engagement protrusion 437 pushes the inner wall surface of the engagement slot 443 in the opposite direction to the direction in the case of entering so that the first and second shutter members 441 and 442 rotate to the position in which the aperture hole 421 is closed as shown in FIG. 12A. Here, since the closing operation is performed in the state in which only the outer circumference D3 of the disc D contacts the accommodation surface 432, the information area D2 is safely kept. Also, in this process, the guide groove 438a of the support member 438 slides along the inclined rail 454 in the opposite direction to the direction in the case of entering to lower the disc holder 450 as shown in FIGS. 15A and 15B. Consequently, the aperture hole 421 is closed by the first and second shutters 441 and 442 and the gap g between the outer circumference D3 of the disc D and the outer circumference 436 of the ring rotator 430 is covered by the disc holder 450 so that the recording surface D2, that is, the information area, is safely protected from a foreign material, such as dust. Thus, since all passages through which the dust can be introduced toward the recording surface D2, that is, the information area, are blocked when the disc cartridge 400 is ejected from the disc drive, the information area D2 can be prevented from contamination when being kept in the disc cartridge 400.

In the above shutter closed state, since the step surfaces 441a and 441b, and 442a and 442b, of the first and second shutter members 441 and 442 are vertically folded onto each other, when the shutter 440 is pressed inward the upper and lower cases 410 and 420 through the aperture hole 421, they are not easily pushed. Thus, the deformation of the shutter 440 by the external force can be prevented and also the closed state of the aperture hole 421 can be firmly maintained.

The above-described disc cartridge of the present invention has the following effects.

First, by blocking all passages through which dust can be introduced toward the information area of the disc, and the gap between the outer circumference of the disc and the non-information area at the inner circumference side of the disc, the possibility of contamination of the information area of the disc by dust can be reduced.

Second, since the disc holder ascends when being used in the disc drive, and the disc holder descends and closely contacts the disc when not used, an entire height of the disc cartridge held by a hand of a user is reduced, providing the user with a slim disc cartridge.

Third, by having the shutter members vertically folded onto each other at several positions, the deformation of the shutter by the external force is prevented and the closed state can be firmly maintained.

Fourth, since the shutter is formed to contact only the outer circumference of the disc that is the non-information area of the disc, the information area of the disc can be safely kept during the opening/shutting operation of the aperture hole.

Fifth, when the disc holder is separated only from the upper case by rotating with respect to the upper case, the disc can be easily replaced through the open hole of the upper case.

Although a few preferred embodiments of the present invention have been shown and described, it would be appreciated by those skilled in the art that changes may be made in this embodiment without departing from the principles and spirit of the invention, the scope of which is define in the claims and their equivalents.

What is claimed is:

1. A disc cartridge used in a recording/reproducing apparatus, comprising:
   a case accommodating a disc, and having an aperture hole formed on a first surface of the case so that the recording/reproducing apparatus accesses a recording surface of the disc, and an inner surface defining an open hole formed on a second surface to be open to an outside of the case;
   a shutter installed in the case to open/shut the aperture hole;
   a disc holder movably installed at a side of the second surface, and covering a gap between an outer circumference of the disc and the inner surface of the open hole when the disc holder moves toward the disc; and
   a shutter driving mechanism moving the shutter so that the aperture hole is shut when the disc holder moves toward the disc.

2. The disc cartridge as claimed in claim 1, wherein the shutter comprises:
   a circular shutter member rotatably installed in the case, and having a cut portion and an accommodation surface where the outer circumference of the disc is disposed; and
   a pivot shutter member installed to pivot in the cut portion of the circular shutter member,
   wherein the aperture hole is selectively open/shut according to movements of the circular shutter member and the pivot shutter member.

3. The disc cartridge as claimed in claim 2, wherein the recording/reproducing apparatus comprises a disc drive having an opening gear, and the shutter driving mechanism comprises:
   a gear portion provided at the circular shutter member and engaged with the opening gear installed in the disc drive when the disc cartridge is inserted into the disc drive so that the circular shutter member rotates according to a cartridge insertion/release operation;
   an engagement unit rotating the pivot shutter member by being engaged with the circular shutter member; and
   a locking unit selectively locking the circular shutter member according to the cartridge insertion/release operation.

4. The disc cartridge as claimed in claim 3, wherein the engagement unit comprises first and second push portions provided at the circular shutter member to push the pivot shutter member, the first push portion pushes the pivot shutter member to pivot when the circular shutter member rotates in a first direction, and the second push portion pushes the pivot shutter member to pivot when the circular shutter member rotates in a second direction opposite to the first direction.

5. The disc cartridge as claimed in claim 3, wherein the locking unit comprises:
   a locking lever rotatably installed at the case and integrally formed with a locking protrusion coupled to the gear portion;
   an elastic piece providing an elastic force to the locking protrusion so that the locking protrusion rotates in a direction in which the locking protrusion is coupled to the gear portion; and
   an interference protrusion unlocking the locking protrusion from the gear portion according to an interference between the locking lever and the opening gear when the disc cartridge is inserted into the disc drive.

6. The disc cartridge as claimed in claim 2, further comprising:
   an elevating mechanism moving the disc holder toward/away the disc.

7. The disc cartridge as claimed in claim 6, wherein the elevating mechanism comprises:
   a rib protruding from the disc holder;
   first and second push portions provided at the circular shutter member to push the rib during a rotation of the circular shutter member to rotate the disc holder; and
   first and second inclined surfaces provided at the case so that the rib slides and moves along the first and second inclined surfaces during a rotation of the disc holder,
   wherein, when the circular shutter member rotates in a direction in which the aperture hole is open, the first push portion pushes the rib to ascend along the first inclined surface, and, when the circular shutter member rotates in another direction in which the aperture hole is closed, the second push portion pushes the rib to descend along the second inclined surface.

8. The disc cartridge as claimed in claim 7, wherein the first push portion comprises:
   a first push surface pushing the rib to ascend along the first inclined surface when the circular shutter member begins to rotate; and
   a second push surface pushing the rib to ascend up to an end of the first inclined surface subsequent to the first push surface.

9. The disc cartridge as claimed in claim 7, wherein: the case comprises,
   a cut groove formed on the case so that, when the disc holder is inserted through the open hole, the rib passes through the cut groove; and
   the disc holder comprises,
   an auxiliary rib disposed at a position to block the cut groove when the rib rotates and descends along the second inclined surface after passing through the cut groove.

10. The disc cartridge as claimed in claim 2, wherein the shutter comprises:
    a coupling groove formed on one of the circular shutter member and the pivot shutter member; and
    a coupling protrusion coupled to the coupling groove and formed on the other one of the circular shutter member and the pivot shutter member, so that the coupling protrusion is inserted into the coupling groove in a state in which the aperture hole is closed.

11. The disc cartridge as claimed in claim 2, wherein the shutter comprises:
    step surfaces respectively provided at each of the circular shutter member and the pivot shutter member such that the step surfaces are vertically folded onto each other.

12. The disc cartridge as claimed in claim 2, wherein the circular shutter member comprises:
    a protruding piece protruding from a rear surface of the circular shutter member toward the aperture hole.

* * * * *

UNITED STATES PATENT AND TRADEMARK OFFICE
CERTIFICATE OF CORRECTION

PATENT NO. : 7,146,625 B2 Page 1 of 1
APPLICATION NO. : 10/392398
DATED : December 5, 2006
INVENTOR(S) : Jae-yong Eum et al.

It is certified that error appears in the above-identified patent and that said Letters Patent is hereby corrected as shown below:

Column 16, line 33, start a new paragraph after "wherein:"

Signed and Sealed this

Twenty-seventh Day of March, 2007

JON W. DUDAS
*Director of the United States Patent and Trademark Office*